(12) United States Patent
Han et al.

(10) Patent No.: US 12,071,747 B2
(45) Date of Patent: Aug. 27, 2024

(54) SYSTEM AND METHOD FOR RECOVERING AND REUSING GRAYWATER

(71) Applicant: Kohler (China) Investment Co., Ltd., Shanghai (CN)

(72) Inventors: Bojian Han, Shanghai (CN); Taiwoon Woon, Shanghai (CN); Yinting You, Shanghai (CN)

(73) Assignee: Kohler (China) Investment Co., Ltd., Shanghai (CN)

(*) Notice: Subject to any disclaimer, the term of this patent is extended or adjusted under 35 U.S.C. 154(b) by 164 days.

(21) Appl. No.: 17/356,083

(22) Filed: Jun. 23, 2021

(65) Prior Publication Data

US 2021/0404153 A1 Dec. 30, 2021

(30) Foreign Application Priority Data

Jun. 30, 2020 (CN) .......................... 202010619856.2

(51) Int. Cl.
*E03B 1/04* (2006.01)
*C02F 1/00* (2023.01)
(Continued)

(52) U.S. Cl.
CPC .............. *E03B 1/042* (2013.01); *C02F 1/001* (2013.01); *C02F 1/441* (2013.01); *C02F 2103/002* (2013.01); *E03B 2001/045* (2013.01)

(58) Field of Classification Search
CPC .... E03B 1/041; E03B 1/042; E03B 2001/045; E03B 2001/047; C02F 1/441; C02F 2103/002
See application file for complete search history.

(56) References Cited

U.S. PATENT DOCUMENTS 4,228,006 A * 10/1980 Hanna ..................... E03B 1/04
   210/167.3
6,383,369 B2   5/2002 Elston
(Continued)

FOREIGN PATENT DOCUMENTS

CN   201695469 U   1/2011
CN   202370053 U   8/2012
(Continued)

OTHER PUBLICATIONS

Chinese Office Action from Chinese Patent Application No. 202110689390.8, dated Dec. 8, 2022, 21 pages. (including English summary).

(Continued)

*Primary Examiner* — Kevin F Murphy
(74) *Attorney, Agent, or Firm* — Lempia Summerfield Katz LLC

(57) ABSTRACT

The present disclosure provides a system for recovering and reusing graywater generated from at least one graywater source in a building. The system includes a controller configured to control recovery and reuse of the graywater; a graywater recovery device communicably coupled to the controller and configured to recover the graywater from the graywater source of the building; and a graywater distributor communicably coupled to the controller, connected to the graywater recovery device, and configured to distribute the recovered graywater to at least one target position in the building for reuse, wherein the controller controls the graywater recovery device to deliver the graywater to the graywater distributor according to a control signal sent by a user, and the controller controls the graywater distributor to deliver the graywater to a target position designated by the user for reuse according to a control signal sent by the user.

15 Claims, 22 Drawing Sheets

(51) Int. Cl.
*C02F 1/44* (2023.01)
*C02F 103/00* (2006.01)

(56) References Cited

U.S. PATENT DOCUMENTS

| | | | |
|---|---|---|---|
| 8,141,584 B1* | 3/2012 | Ellyson | E03B 7/12 |
| | | | 137/395 |
| 9,579,607 B2* | 2/2017 | Hong | G01N 15/0826 |
| 9,975,783 B2* | 5/2018 | Garios | C02F 1/008 |
| 10,094,096 B2* | 10/2018 | Lee | C02F 1/441 |
| 10,214,880 B2* | 2/2019 | Robb | E03D 5/003 |
| 2012/0037234 A1 | 2/2012 | Eckman | |
| 2013/0140233 A1* | 6/2013 | Taniguchi | B01D 61/026 |
| | | | 210/252 |
| 2013/0180928 A1 | 7/2013 | Vielma | |
| 2014/0059755 A1 | 3/2014 | Garrels et al. | |
| 2016/0016836 A1 | 1/2016 | Sudnick et al. | |
| 2016/0030891 A1* | 2/2016 | Oskoui | B01D 65/00 |
| | | | 210/321.87 |
| 2017/0088436 A1 | 3/2017 | Espinoza et al. | |
| 2017/0172377 A1 | 6/2017 | Lee et al. | |
| 2018/0127953 A1 | 5/2018 | Noren | |

FOREIGN PATENT DOCUMENTS

| | | |
|---|---|---|
| CN | 103850297 A | 6/2014 |
| CN | 204126035 U | 1/2015 |
| CN | 104695513 A | 6/2015 |
| CN | 205000419 U | 1/2016 |
| CN | 106884461 A | 6/2017 |
| KR | 20030077887 A | 10/2003 |
| WO | 2013068545 A1 | 5/2013 |
| WO | 2019164436 A1 | 8/2019 |
| WO | 2020039278 A1 | 2/2020 |

OTHER PUBLICATIONS

Chinese Office Action for Chinese Patent Application No. 2023053000072550, dated May 30, 2023, 25 pages. (including English translation).
Examination Report from Indian Patent Application No. 202114028788, dated Nov. 21, 2022, 7 pages.
Chinese Office Action for Chinese Patent Application No. 2023101901980250, dated Oct. 19, 2023, 19 pages. (including English translation).

* cited by examiner

SYSTEM AND METHOD FOR RECOVERING AND REUSING GRAYWATER

CROSS REFERENCE TO RELATED APPLICATION

This application claims the benefit of priority to: Chinese Patent Application No. 202010619856.2 filed in the Chinese Intellectual Property Office on Jun. 30, 2020, which is hereby incorporated by reference in its entirety.

FIELD

The present disclosure relates to a system and a method for recovering and reusing graywater, and particularly to a system and a method for recovering and reusing graywater generated from a building.

BACKGROUND

Freshwater that can be directly drunk by human beings is also called "white water" or "whitewater". Pathogens and impurities in water resources collected from rivers and lakes are removed by modern water processing, so as to obtain the whitewater. The whitewater is delivered to a residential building and an office building through an urban pipeline for the human beings to drink or use.

However, the shortage of freshwater resources is an urgent problem of the whole world. Although 70% of the earth's surface is covered with water, only 3% of the earth's water resources can be used by the human beings. According to the statistics of the World Wide Fund for Nature (WWF), about 1.1 billion people in the world are extremely short of freshwater resources, and about 2.4 billion people are unable to get clean freshwater, thus being easily infected with water-borne diseases such as cholera, typhoid fever and diarrhea. The diarrhea alone causes about 2 million deaths every year, most of which are children. The increase of water requirement is one of the important reasons for the shortage of freshwater resources. Although household water consumption accounts for only 10% of the total water intake, the household water consumption has been increased by five times in the past 50 years, reaching 4 trillion cubic meters per year in the world.

The human beings also generate a large amount of wastewater while consuming the freshwater. The wastewater may be divided into "black water" or "blackwater", and "gray water" or "graywater", or "grey water" or "greywater". The blackwater refers to wastewater containing feces and urine generated from a toilet. The blackwater usually contains pathogens, so it is difficult for human beings to reuse the blackwater. The graywater refers to wastewater generated from the residential building or the office building without being polluted by feces and urine, which is namely all wastewaters except toilet wastewater. Sources of the graywater include: kitchen residual wastewater, hand washing sink wastewater, shower/bath wastewater, washing machine wastewater, irrigation wastewater, etc. A cleanliness of the graywater is between a cleanliness of drinking water and a cleanliness of the blackwater. Although the graywater cannot be directly drunk by human beings like the whitewater, compared with the blackwater, the graywater contains far fewer pathogens and is easier to process. Therefore, the collection and reuse of the graywater may provide a new way to alleviate the shortage of water resources in the world.

On the other hand, product developers do not consider special needs of people who believe in Islam when designing a sanitary outfit. A sanitary outfit only includes a hand washing sink and a faucet for a user to wash a hand or a face. However, Islamic Wudu also requires the believer to clean a foot, a private part (such as a urine part), a nasal cavity, an oral cavity, etc. When washing the foot, the people who believe in Islam must lift the foot, put the foot into the hand washing sink, and wash toes and an ankle carefully. However, the hand washing sink is usually arranged at a height above a crotch of an adult, so it is very inconvenient for the elderly, children and people with short stature. Although a toilet seat may wash a female private part, no sanitary device is capable of washing a male private part (such as a urine part). Therefore, the special needs of the people who believe in Islam cannot be met.

Therefore, it is necessary to provide a system and a method for collecting and reusing the graywater generated from the residential building or the office building, so as to improve a utilization rate of water resources and alleviate the shortage of water resources in the world, and take into account the special needs of the people who believe in Islam at the same time.

SUMMARY

The present disclosure relates to a system for recovering and reusing graywater and a method therefor, and the graywater is generated from at least one graywater source in a building. The system includes a controller used for controlling recovery and reuse of the graywater; a graywater recovery device in communication connection with the controller and used for recovering the graywater from the graywater source of the building; and a graywater distributor in communication connection with the controller, communicated with the graywater recovery device, and used for distributing the recovered graywater to at least one target position in the building for reuse. The controller controls the graywater recovery device to deliver the graywater to the graywater distributor according to a control signal sent by a user, and the controller controls the graywater distributor to deliver the graywater to a target position designated by the user for reuse according to a control signal sent by the user.

In an embodiment, the system further includes: a graywater processing device in communication connection with the controller and used for preprocessing the graywater before the graywater is reused. The graywater processing device is mounted in an upstream position of the graywater recovery device, between a downstream position of the graywater recovery device and an upstream position of the graywater distributor, in a downstream position of the graywater distributor, in at least one graywater source in the building and/or the target position.

In an embodiment, the graywater processing device includes a reverse osmosis device, and the reverse osmosis device includes: a liquid inlet used for receiving a liquid to be processed; a purified water outlet used for outputting purified water generated by reverse osmosis processing; a graywater outlet used for outputting graywater generated by reverse osmosis processing; and a reverse osmosis membrane arranged between the liquid inlet, and the purified water outlet and the graywater outlet, and used for selectively removing impurities in the liquid to be processed. The liquid to be processed penetrates through the reverse osmosis membrane under an action of an osmotic pressure, and the impurities are blocked by the reverse osmosis membrane to form the graywater which is outputted from the graywater outlet and then reused.

In an embodiment, a ratio of the purified water outputted from the purified water outlet to the graywater outputted from the graywater outlet is adjustable according to a reuse purpose. According to the reuse purpose, the osmosis membrane allows impurities with a certain size to penetrate through, so as to form purified water containing the impurities.

In an embodiment, the at least one graywater source in the building includes: graywater generated from a kitchen, a hand washing sink, a shower/bath, a washing machine, a refrigerator, irrigation and/or Islamic Ghusl/Wudu.

In an embodiment, the controller is also used for controlling the graywater distributor to distribute the graywater according to a cleanliness of the graywater required by a reuse purpose and a cleanliness of the graywater source. When a cleanliness of the graywater required by a purpose is lower than the cleanliness of the graywater source, the graywater source is capable of being used for the purpose.

The present disclosure further provides a sink applied to a system for recovering and reusing graywater. The sink includes a sink body including a water basin located at an upper part of the sink body and a cavity located at a lower part of the sink body, wherein the water basin includes a water outlet; a drainage pipeline including a first end communicated with the water outlet and a second end communicated with a sewer; a sink graywater recovery pipeline communicated with the second end of the drainage pipeline; a washing device movably extended from the cavity to open the washing device for washing a foot of a user, and movably retracted in the cavity to close the washing device; a switching device used for switching between the sewer and the sink graywater recovery pipeline; and a pedal device connected with the switching device, and used for controlling the switching device to switch. When the switching device opens the sewer and closes the sink graywater recovery pipeline, the graywater is led into the sewer and discarded. When the switching device opens the sink graywater recovery pipeline and closes the sewer, the graywater is led into the washing device, and used for washing the foot of the user.

In an embodiment, the sink further includes a graywater processing device connected with the sink graywater recovery pipeline, and used for preprocessing the graywater before the graywater enters the washing device. The graywater includes an impurity suspended layer floating on a surface of the graywater, an impurity deposited layer deposited on a bottom port of the graywater, and an intermediate layer located between the impurity suspended layer and the impurity deposited layer. The preprocessing device is used for extracting the graywater in the intermediate layer so as to reuse the graywater.

In an embodiment, the sink further includes a sink graywater collecting device used for collecting the graywater; and the drainage pipeline includes a first drainage pipeline and a second drainage pipeline, wherein the second drainage pipeline includes a first end and a second end. The water basin includes a first water basin communicated with the first drainage pipeline, and used for leading the graywater into the sewer and discarding the graywater; and a second water basin communicated with the first end of the second drainage pipeline. The second end of the second drainage pipeline is communicated with the sink graywater collecting device, for leading the graywater into the sink graywater collecting device.

In an embodiment, the sink further includes a graywater processing device located between the second water basin and the sink graywater collecting device, for preprocessing the graywater before the graywater enters the sink graywater collecting device. The graywater processing device includes a graywater filtering device and/or a reverse osmosis device.

The present disclosure further provides a male urinal applied to a system for recovering and reusing graywater, wherein the male urinal includes: a urinal body, a water basin located at an upper part of the urinal; a urinal basin located at a lower part of the urinal body; a first water outlet used for providing a first water source for washing a hand of a male user to the water basin, so as to meet a requirement of daily hand washing and/or Islamic Wudu hand washing; and a second water outlet used for providing a second water source to the urinal basin for washing the urinal basin.

In an embodiment, the water basin and the urinal basin are respectively recessed from a front end face of the urinal body to a rear end face of the urinal body at upper and lower parts of the urinal body. A partition face is formed at a joint of recesses of the water basin and the urinal basin. The first water outlet is arranged below a top face of the urinal body, and the second water outlet is arranged below the partition face. A drainage port is arranged in the partition face, so that graywater generated by hand washing/Wudu is led into the urinal basin through the drainage port and the second water outlet, so as to finish flushing the urinal basin.

In an embodiment, the urinal body includes a groove. The water basin is mounted at an upper part of the groove of the urinal body, so as to form the urine basin at a lower part of the groove of the urinal body. The first water outlet is arranged below a top face of the water basin, and the second water outlet is arranged below a bottom face of the water basin.

In an embodiment, the male urinal further includes a handle or an induction device used for opening the first water source of the first water outlet and/or the second water source of the second water outlet.

The present disclosure further provides a male urinal which is applied to a system for recovering and reusing graywater, wherein the male urinal includes: a urinal body including a urinal basin and used for a male user; and a water outlet device arranged on a top face of the urinal body and extend from a rear end face of the urinal body to a front end face of the urinal body into an upper part of a space formed by the urinal basin. The water outlet device includes a first water outlet located at a front part and a second water outlet located at a rear part. The first water outlet is used for washing a male private part, so as to meet a requirement of daily private part washing and/or Islamic Wudu private part washing, and the second water outlet is used for flushing the urinal basin.

The present disclosure further provides a method for recovering and reusing graywater, and the graywater is generated from at least one graywater source in a building. The method includes the following steps of: controlling, by a controller, recovery and reuse of the graywater; recovering, by a graywater recovery device in communication connection with the controller, the graywater from the graywater source of the building; and distributing, by a graywater distributor in communication connection with the controller and communicated with the graywater recovery device, the recovered graywater to at least one target position in the building for reuse. The controller controls the graywater recovery device to deliver the graywater to the graywater distributor according to a control signal sent by a user, and the controller controls the graywater distributor to deliver the graywater to a target position designated by the user for reuse according to a control signal sent by the user.

In an embodiment, the method further includes preprocessing, by a graywater processing device in communication connection with the controller, the graywater before the graywater is reused. The graywater processing device is mounted in an upstream position of the graywater recovery device, between a downstream position of the graywater recovery device and an upstream position of the graywater distributor, in a downstream position of the graywater distributor, in the at least one graywater source in the building and/or the target position.

In an embodiment, the at least one graywater source in the building includes: graywater generated from a kitchen, a hand washing sink, a shower/bath, a washing machine, a refrigerator, irrigation and/or Islamic Ghusl/Wudu.

In an embodiment, the method further includes controlling, by the controller, the graywater distributor to distribute the graywater according to a cleanliness of the graywater required by a reuse purpose and a cleanliness of the graywater source. When a cleanliness of the graywater required by a purpose is lower than the cleanliness of the graywater source, the graywater source is capable of being used for the purpose.

Therefore, the system and the method for recovering and reusing graywater of the present disclosure can recycle the graywater generated in the building, and can simultaneously meet the requirement of the people who believe in Islam for Wudu, such as reusing the graywater to wash a foot, a hand, and a male private part.

BRIEF DESCRIPTION OF THE FIGURES

FIG. 3 is a side view of the sink and FIG. 8 is a rear view of the sink.

DETAILED DESCRIPTION

The graywater of the present disclosure includes: kitchen residual wastewater, hand washing sink wastewater, shower/bath wastewater, washing machine wastewater, refrigerator wastewater, irrigation wastewater, and/or Islamic Ghusl/Wudu wastewater. The kitchen residual wastewater includes wastewater generated by washing fruits and vegetables and/or kitchen utensils. The hand washing sink wastewater includes wastewater generated by washing a hand and a face and/or brushing teeth. The blackwater of the present disclosure includes toilet flushing wastewater, kitchen residual wastewater and/or hand washing sink wastewater. For example, after washing greasy kitchen utensils, the graywater contains a lot of grease, and the graywater may be considered to be unsuitable for reuse (which means that the graywater is considered to be the blackwater), and thus be directly discharged into a sewer.

System and Method for Recovering and Reusing Graywater

Figure 1:
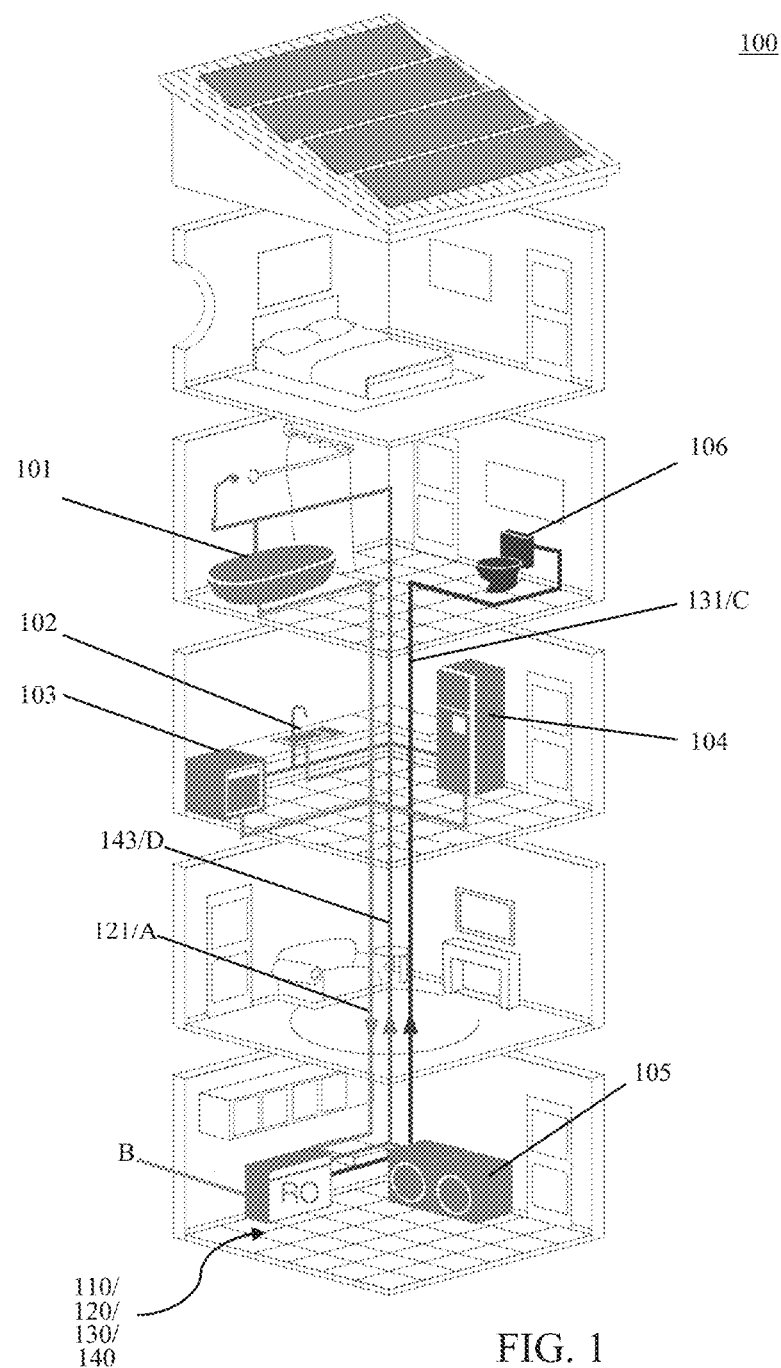
FIG. 1 shows a schematic diagram of different floors of a system for collecting and reusing graywater according to an embodiment of the present disclosure.
Figure 2:
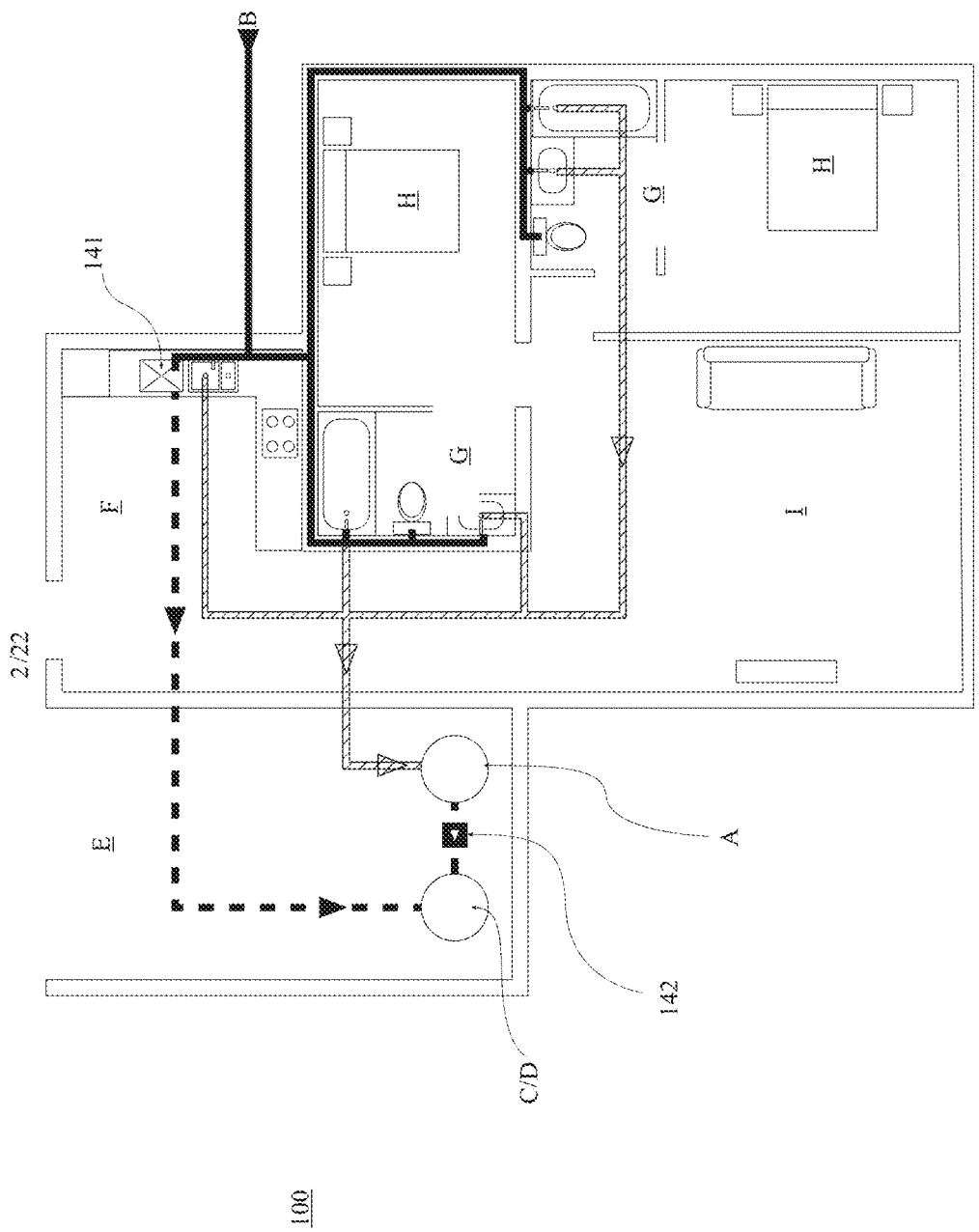
FIG. 2 shows a plane graph of the same floor of the system for collecting and reusing graywater according to the embodiment of the present disclosure.
Figure 3:
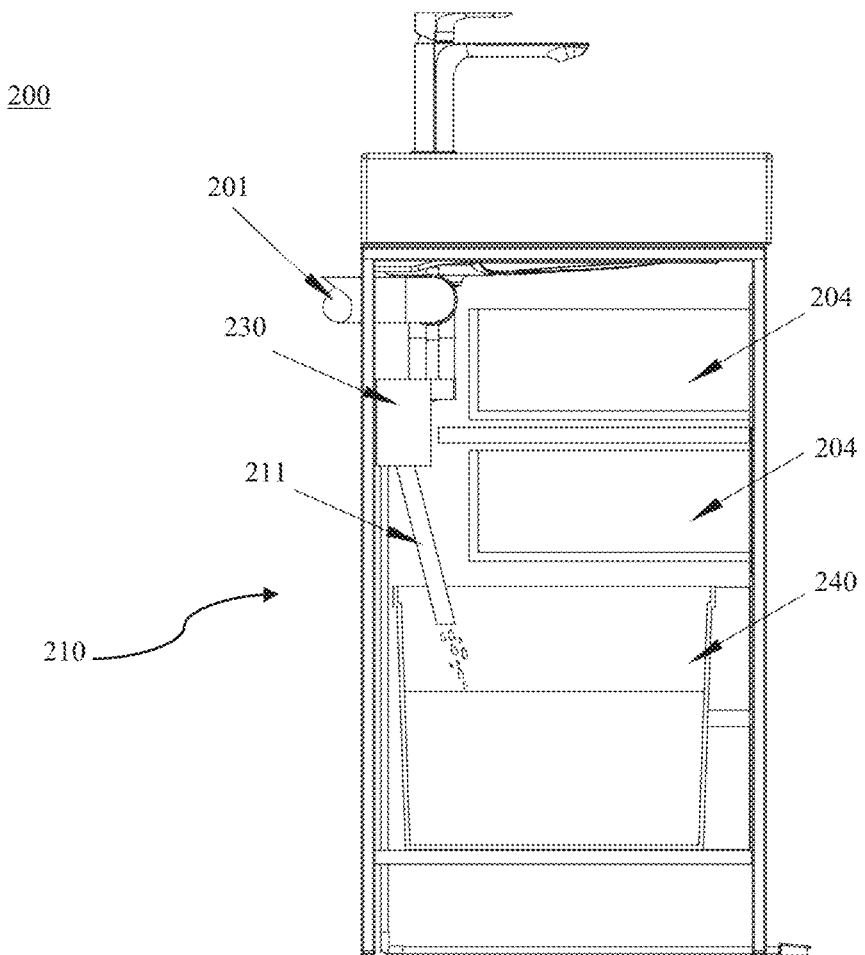
FIG. 3 to FIG. 10 show a sink applied to a system for recovering and reusing graywater according to an embodiment of the present disclosure.
Figure 4:
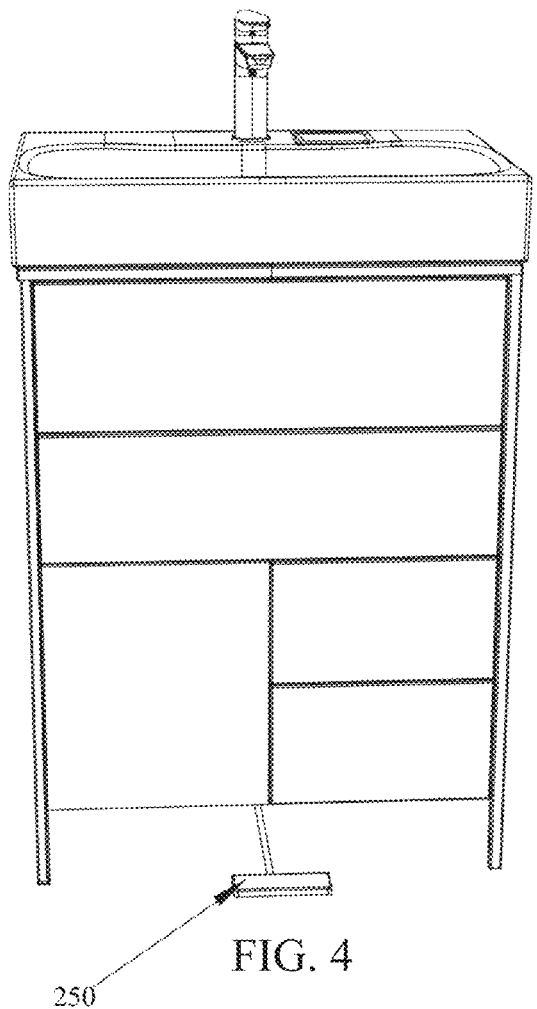
Figure 5:
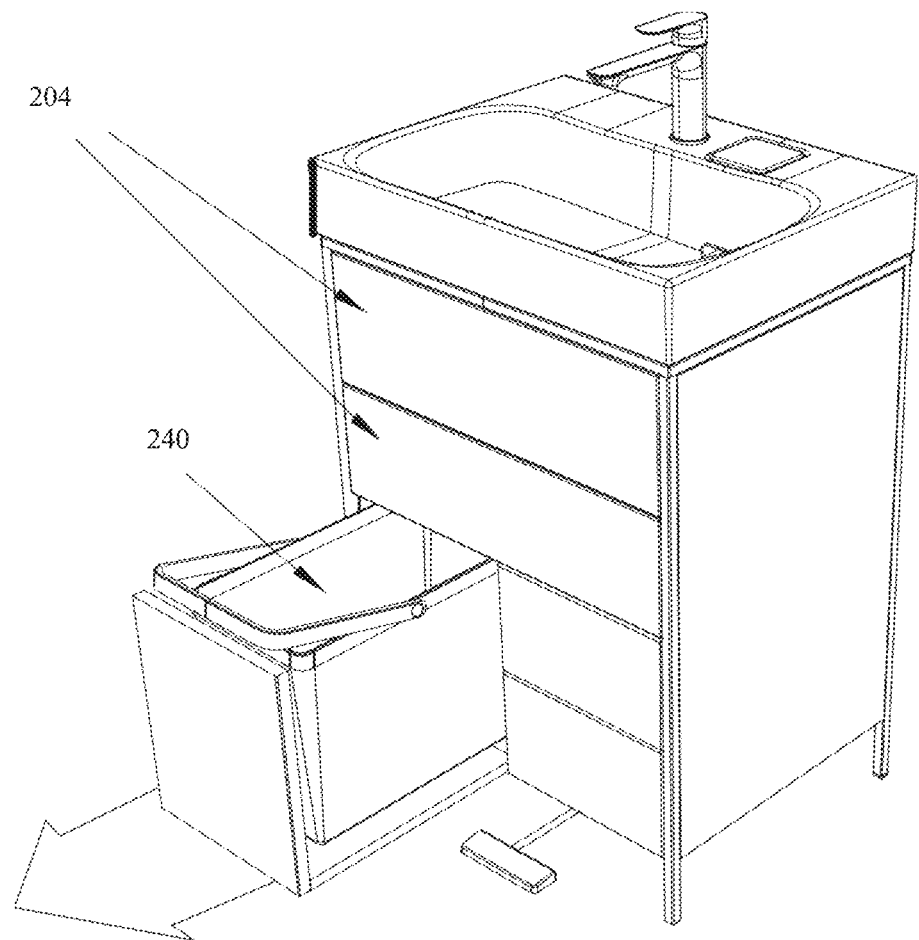
Figure 6:
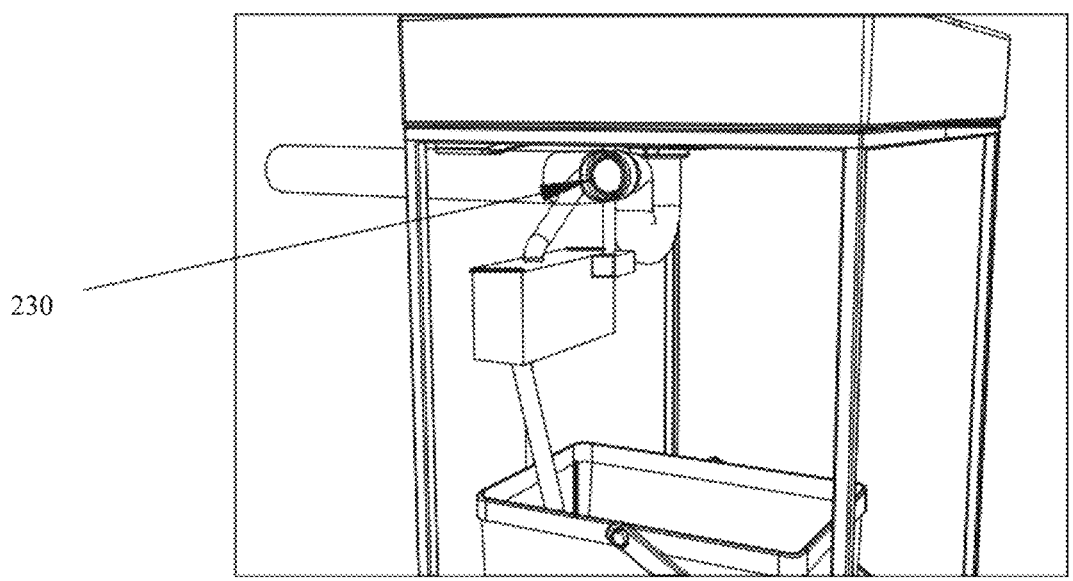

Various aspects of the present disclosure are described in more detail hereinafter. FIG. 1 and FIG. 2 respectively provide a schematic diagram of different floors of a system 100 for collecting and reusing graywater and a plane graph of a same floor of the system for collecting and reusing graywater according to an embodiment of the present disclosure. In the embodiment shown in FIG. 1, a generation source of the graywater ("graywater source") includes graywater generated from a bathtub 101, a hand washing sink 102, a dishwasher 103, a refrigerator 104, and a washing machine 105. The refrigerator 104 may be a refrigerator with functions of an ice maker and/or a water distributor. In the embodiment shown in FIG. 1, target positions of reused graywater include the bathtub 101, the hand washing sink 102, the dishwasher 103, the refrigerator 104, the washing machine 105, and a toilet/urinal 106. The refrigerator 104 may be the refrigerator with the functions of the ice maker and/or the water distributor. In the embodiment shown in FIG. 1, the system 100 for collecting and reusing graywater delivers four streams of liquid, including graywater A generated from the graywater source delivered by a discharge pipeline 121; freshwater (such as tap water) B delivered by a tap water pipeline (not shown in the drawings); graywater (or cleaner graywater) C obtained by preprocessing (such as RO filtration processing) delivered by a pipeline for reusing water 131; and purified water D obtained by preprocessing (such as RO filtration processing) delivered by a purified water pipeline 143. Arrows in FIG. 1 indicate flow directions of the liquid. FIG. 2 shows a In the embodiment of FIG. 2, the freshwater (such as the tap water) delivered by the tap water pipeline B (not shown in the drawings) is indicated by a solid line. In FIG. 2, graywater without being preprocessed A is indicated by a slash line. In FIG. 2, preprocessed graywater/cleaner graywater C or purified water D is indicated by a dashed line. Arrows in FIG. 2 indicate flow directions of the liquid. FIG. 2 also illustrates a garage E, a kitchen F, two restrooms G, two bedrooms H, and living room I, which may be located on the same floor or the different floors.

As shown in FIG. 1, the system 100 for collecting and reusing graywater includes a controller 110, a graywater recovery device 120 in communication connection with the controller 110, a graywater distributor 130 in communication connection with the controller 110, and at least one graywater processing device 140 in communication connection with the controller 110. The graywater recovery device 120 is in through connection with the graywater distributor 130. In an embodiment, a device located on a left side of a ground floor in FIG. 1 includes the controller 110, the graywater recovery device 120, the graywater distributor 130 and/or the at least one graywater processing device 140, such as a reverse osmosis ("RO") device 141 (as shown in FIG. 2). A device located on a right side of the ground floor in FIG. 1 includes the washing machine 105. As long as the purpose and effect of the present disclosure are realized, the above devices may be arranged and combined in different ways. Delivery directions of the liquid are not limited to the directions shown in FIG. 1. For example, it is unnecessary to arrange the washing machine 105 on the ground floor, and the controller 110 and the graywater recovery device 120 are located on the left side of the ground floor while the graywater distributor 130 and/or the at least one graywater processing device 140 are located on the right side of the ground floor. Alternatively, it is unnecessary to arrange the graywater processing device 140. Alternatively, the at least one graywater processing device 140 is independent of the controller 110, the graywater recovery device 120 or the graywater distributor 130. Alternatively, the controller 110, the graywater recovery device 120, the graywater distributor 130 and/or the at least one graywater processing device 140 may be integratedly or independently arranged. For another example, all devices on the ground floor may be arranged on a top floor of the building, so that the delivery directions of the liquid are opposite to the directions shown in FIG. 1 (explained in detail hereinafter).

The system 100 for collecting and reusing graywater is arranged in a building. In this embodiment, the building includes a residential building. In another embodiment, the building includes any building capable of generating the graywater, such as an office building, a school, a hospital, a factory, and a warehouse. In this embodiment, the controller 110 is arranged on the ground floor of the building, such as a basement or a garage. In another embodiment, the controller 110 may be arranged in any room on the top floor or other floors of the building, such as a bathroom. The controller 110 is used for receiving a control signal generated by a user and controlling the graywater recovery device 120 and the graywater distributor 130 according to the control signal. The user includes a resident living in the building, a staff working in the building, and a property management staff of the building. According to an identity of the user, different control authorities may be set for the users. For example, the resident is granted with an authority to manage a residence, the working staff is granted with an authority to manage an office, and the property management staff is granted with an authority to manage a certain floor or each floor. The authorities include an authority to discharge the graywater to the graywater recovery device 120 and/or an authority to receive the graywater delivered from the graywater distributor 130. The user may send a control signal of discharge and/or reuse to the controller 110 through a user control interface (not shown in the drawings), such as a control panel and a remote controller. The control signal of discharge may include an instruction of discharge by an amount designated by the user. In an embodiment, the control signal of reuse may include an instruction of reuse by a designated amount and/or in a target position. The target position includes the residence, the office, and the certain floor or each floor matched with the control authority of the user. When the controller 110 receives the control signal of discharge sent by the user, according to the control signal and the control authority of the user, the controller 110 discharges the graywater generated from the residence, the office, and the certain floor or each floor of the user to the graywater recovery device 120, so as to recover the graywater. When the controller 110 receives the control signal of reuse sent by the user, according to the control signal and the control authority of the user, the controller 110 controls the graywater distributor 130 to deliver the recovered graywater to the residence, the office, and the certain floor or each floor designated by the user, so as to reuse the graywater.

The graywater recovery device 120 is used for collecting the graywater generated from each floor of the building, so as to recover the graywater. Specifically, when the user sends the control signal of discharge to the controller 110 via the user control interface, the controller 110 controls the graywater recovery device 120 to recover designated graywater through the discharge pipeline 121 corresponding to the graywater designated by the user. The discharge pipeline 121 is connected with the generation source of the graywater in the building. In the embodiment shown in FIG. 1, the generation source of the graywater includes the graywater generated from the bathtub 101, the hand washing sink 102, the dishwasher 103, the refrigerator 104, and the washing machine 105. The refrigerator 104 may be the refrigerator with the functions of the ice maker and/or the water distributor. The generation source of the graywater may include generation sources located on a same floor (as shown in FIG. 2) or different floors (as shown in FIG. 1). In another embodiment, the generation source of the graywater further includes the kitchen residual wastewater, the shower wastewater and/or the irrigation wastewater. In another embodiment, the graywater may be mixed with the freshwater (such as the tap water) according to a certain ratio to form a graywater mixture, which is recovered, reused and preprocessed. The mixing may be executed by a divertor or a mixer (not shown in the drawings). For example, when the graywater A generated by the graywater source or the graywater (or the cleaner graywater) C generated by the RO device is insufficient, the purified water D generated by the RO device 141 or the tap water B delivered by the tap water pipeline may be led in for mixing. For another example, when the purified water D generated by the RO device 141 or the tap water B delivered by the tap water pipeline is insufficient, the graywater A generated by the graywater source or the graywater (or the cleaner graywater) C generated by the RO device may be led in for mixing.

The recovered graywater is stored in the graywater recovery device 120 until the user sends the control signal of reuse to the controller 110 via the user control interface. According to the control signal of reuse of the user, the controller 110 controls the graywater recovery device 120 to deliver a default amount or designated amount of graywater to the graywater distributor 130. In the embodiment, the graywater recovery device 120 is arranged on the ground floor of the building, such as the basement or the garage. In another embodiment, the graywater recovery device 120 may be arranged on the top floor or any other floor of the building. Therefore, the discharge pipeline 121 of each floor may cooperate with a water pump (not shown in the drawings) for use, so as to provide upward power for the graywater to reach a height of the graywater recovery device 120. In another embodiment, the discharge pipeline 121 of each floor may also cooperate with a one-way valve (not shown in the drawing), so as to prevent, in a process of delivering the graywater upwardly, the graywater from flowing back, due to gravity, to the residence, the office or the floor where the graywater is generated.

The graywater distributor 130 is used for distributing the graywater to the floor or the room of the building, so as to reuse the graywater. Specifically, when the user sends the control signal of reuse to the controller 110 via the user control interface, the controller 110 controls the graywater recovery device 120 to deliver the default amount or designated amount of graywater to the graywater distributor 130. After the graywater distributor 130 obtains the graywater from the graywater recovery device 120, the graywater obtained by the graywater distributor 130 is delivered to the target position, such as the residence, the office, and the certain floor or each floor designated by the user through the pipeline for reusing water 131. In the embodiment shown in FIG. 1, the target positions include the bathtub 101, the hand washing sink 102, the dishwasher 103, the refrigerator 104, the washing machine 105, and the toilet/urinal 106. The refrigerator 104 may be the refrigerator with the functions of the ice maker and/or the water distributor. In an embodiment, when the graywater reaches the target position, the graywater may be stored in a water tank (not shown in the drawings) in the target position for subsequent reuse by the user. For example, the water tank may be a water tank of the toilet/urinal 106, which is placed at a high place, so as to increase a water pressure for flushing the toilet/urinal 106 and save a floor space.

The user may select a room where the graywater needs to be reused, such as a restroom, a bathroom, a kitchen, a balcony, etc., via the user control interface of the controller 110 or a user control interface of an independent controller (not shown in the drawings). In another embodiment, the pipeline for reusing water 131 directly delivers the graywater obtained by the graywater distributor 130 to the room where the graywater needs to be reused, such as the restroom, the bathroom, the kitchen, the balcony, etc. In this embodiment, the graywater distributor 130 is arranged on the ground floor of the building, such as the basement or the garage. Therefore, the pipeline for reusing water 131 of each floor may cooperate with the water pump (not shown in the drawings) for use, so as to provide upward power for the graywater to reach heights of the residence, the office, and the certain floor or each floor designated by the user. In another embodiment, the pipeline for reusing water 131 of each floor may also cooperate with the one-way valve (not shown in the drawing), so as to prevent, in the process of delivering the graywater upwardly, the graywater from flowing back to the graywater distributor 130 due to gravity. In another embodiment, the graywater recovery device 120 may be arranged on the top floor or any other floor of the building.

The controller 110 may distribute the graywater according to a water cleanliness required by a reuse purpose and a cleanliness of the graywater. When a cleanliness required by a certain purpose is lower than the cleanliness of the graywater, the graywater is capable of being used for the purpose. For example, the required cleanliness from low to high is as follows: toilet/urinal flushing, irrigation, laundering, Islamic Ghusl/Wudu, shower/bath, fruit and vegetable washing, kitchen utensil washing, hand/face washing and teeth brushing, and drinking water/ice making. The recovery and reuse of the graywater are described in more detail with reference to other accompanying drawings.

In another embodiment, the system 100 for collecting and reusing graywater further includes at least one graywater processing device 140 (as shown in FIG. 1 and FIG. 2) in communication connection with the controller 110, so as to preprocess the graywater before reusing the graywater. The graywater processing device 140 includes a reverse osmosis (RO) device 141 and a filtering device 142. In another embodiment, the graywater processing device includes an asbestos wastewater processing device and/or an activated carbon device. The graywater processing device 140 may be mounted in any position before the graywater enters the target position. For example, the graywater processing device 140 may be mounted in an upstream position of the graywater recovery device 120, between a downstream position of the graywater recovery device 120 and an upstream position of the graywater distributor 130, in a downstream position of the graywater distributor 130, and in at least one graywater source in the building and/or the target position. The graywater processing device 140 may be used as a central device together with the graywater recovery device 120 and the graywater distributor 130 on the ground floor of the building, such as the basement or the garage. In another embodiment, the graywater recovery device 120, the graywater distributor 130 and the graywater processing device 140 may be arranged on the top floor or any other floor of the building. In another embodiment, each room or floor of the target position is provided with the graywater processing device 140, so that the graywater is preprocessed separately before entering the room or floor. In another embodiment, the graywater processing device 140 is arranged in the generation source of the graywater (including the kitchen residual wastewater, the shower wastewater, the washing machine wastewater, the refrigerator and/or irrigation wastewater, etc.), so that the graywater of each generation source may be preprocessed separately.

The graywater may be preprocessed in the following ways. In an embodiment, the user may preprocess the graywater by using an automatic stratification phenomenon of the graywater. For example, when the graywater is the kitchen residual wastewater recovered from the kitchen, the kitchen residual wastewater may include peels and leaves remaining in the graywater after washing fruits and vegetables, which usually deposit to a bottom part of the graywater to form an impurity deposited layer or float on a surface of the graywater to form an impurity suspended layer. The kitchen residual wastewater may also include grease remaining in the graywater after washing the kitchen utensils (such as washing the kitchen utensils through the dishwasher 103 or the hand washing sink 102 as shown in FIG. 1), which usually floats on the surface of the graywater to form the impurity suspended layer. Therefore, the user may remove these easily processed impurities from the graywater by extracting the graywater in an intermediate layer between the impurity suspended layer and the impurity deposited layer. In another embodiment, the user may crush a solid residue in the graywater through a garbage disposal unit, filter the solid residue through the filtering device 142, or adsorb the solid residue through activated carbon.

In the embodiment shown in FIG. 2, the RO device 141 is used for performing advanced processing on the freshwater (the tap water) and/or the graywater. When the user has a high requirement for a water quality or a cleanliness of the freshwater (such as the tap water) is low, the RO device 141 may be used. For example, many areas may be only supplied with hard water as the tap water due to geographical reasons. The hard water contains more calcium ions and magnesium ions, which may cause incrustation, skin dryness/allergy, hair knotting, and bad taste. The RO device removes large-sized impurities such as inorganic ions, bacteria, viruses, organic substances and colloids from the liquid to be processed to obtain the purified water, such as molecular-level purified water. Meanwhile, use of the RO device may generate a large amount of wastewater, for example, the RO device is used to perform wastewater processing on the graywater generated from the whole building. Therefore, it is necessary to reuse the wastewater generated by the RO device.

With reference to FIG. 1 and FIG. 2, the RO device 141 includes a liquid inlet, a purified water outlet, a graywater outlet and a RO membrane (not shown in the drawings). The liquid inlet of the RO device 141 is used for receiving the liquid to be processed, including the freshwater (such as the tap water) or the graywater. The purified water outlet is used for outputting the purified water D generated by RO processing. The generated purified water D may be delivered by the purified water pipeline 143 (as shown in FIG. 1) for the user to use. For example, the purified water D is delivered to the bathtub 101, the hand washing sink 102, the dishwasher 103, the refrigerator 104 and the washing machine 105 for the user to directly drink or use. The graywater outlet is used for outputting the graywater (or the cleaner graywater) C generated by the RO processing, which is delivered by the pipeline for reusing water 131 (as shown in FIG. 1) for the user to reuse. For example, the purified water D is delivered to the bathtub 101, the hand washing sink 102, the dishwasher 103, the refrigerator 104, the washing machine 105, and the toilet/urinal 1106. For example, the graywater C may be inputted into the washing machine 105 for washing articles with a low cleanliness requirement, such as rags and shoes. The RO membrane arranged between the liquid inlet and the purified water and graywater outlets is a membrane only allowing small-sized molecules (such as water molecules) to pass through, so as to selectively remove the above-mentioned large-sized impurities. The liquid to be processed enters an interior of the RO device from the liquid inlet of the RO device and penetrates through the RO membrane under an action of an osmotic pressure. The large-sized impurities in the liquid to be processed are blocked by the RO membrane to form the graywater, which is outputted from the graywater outlet of the RO device.

In an embodiment, the graywater generated by the RO processing may be reused by the graywater recovery device 120 and the graywater distributor 130 under control of the controller 110. The reuse includes toilet flushing and other situations with a low requirement on water cleanliness, which is explained in more detail with reference to the drawings. In another embodiment, when the liquid to be processed is the graywater recovered from the building, the graywater may be preprocessed as described above to remove water-insoluble impurities, so as to improve an efficiency of graywater processing and prolong a service life of the RO membrane. For example, when the graywater is the kitchen residual wastewater recovered from the kitchen, the kitchen residual wastewater may include peels and leaves remaining in the graywater after washing fruits and vegetables, which usually deposit to the bottom part of the graywater or float on the surface of the graywater. The kitchen residual wastewater may also include grease remaining in the graywater after washing the kitchen utensils, which usually floats on the surface of the graywater. Therefore, before the RO processing, the user may remove these easily processed impurities from the graywater by extracting the graywater in the intermedium layer.

In another embodiment, the controller 110 controls a ratio of the purified water outputted by the RO device 141 to the graywater outputted by the RO device. In the prior art, impurities continuously attached to the RO membrane may reduce an efficiency of the RO processing and a service life of the RO membrane, so the RO membrane needs to be washed regularly, which increases washing cost. In this embodiment, the controller 110 may control a ratio of impurities allowed to penetrate through the RO membrane (which means that impurities of a certain size are allowed to penetrate through the RO membrane, so as to form purified water containing the impurities) according to a requirement of the user (which is namely the reuse purpose) and a composition of the liquid to be processed, so as to improve an efficiency of graywater processing, prolong the service life of the RO membrane and reduce a number of times of replacing the RO membrane. For example, a ratio of the purified water outputted by the RO device 141 to the wastewater outputted by the RO device may be controlled to be 3:7, 4:6, and 5:5. In an embodiment, when the user needs to take a shower/bath and flush the toilet, the controller 110 can increase the ratio of the impurities penetrating through the RO membrane (which means that the ratio of the purified water outputted to the wastewater outputted is increased), so as to allow the purified water outputted by the RO device 141 to contain a certain amount of impurities/micro elements for the user to take a shower/bath. These impurities do not affect a body feeling of the user in shower/bath and health of the user. Meanwhile, the wastewater outputted by the RO device 141 is used for toilet flushing. In another embodiment, when the user needs to drink water, make ice and water flowers, and the liquid to be processed mainly contains an organic matter, the controller 110 can decrease the ratio of the impurities penetrating through the RO membrane (which means that the ratio of the purified water outputted to the wastewater outputted is decreased), so that the RO device 141 outputs the purified water with a higher quality for the user to drink. Meanwhile, the wastewater outputted by the RO device 141 contains the organic matter, and is used for toilet flushing. The ratio of the purified water outputted to the wastewater outputted may be implemented by adjusting a pore size of the RO membrane. In another embodiment, the RO device 141 may include a plurality of RO membranes with pores of different sizes. The controller 110 may select a corresponding RO membrane according to the requirement of the user.

In another embodiment, the controller 110, the graywater recovery device 120, the graywater distributor 130 and other devices in the system may be driven by a hydroelectric power device (not shown in the drawings). The hydroelectric power device may be mounted in the discharge pipeline 121 or the recovery pipeline 211, and uses potential energy generated by downward flow of the wastewater in the discharge pipeline 121 or the recovery pipeline 211, so as to obtain power supplied to the above device.

In a method 500 for collecting and reusing graywater according to an embodiment of the present disclosure, the graywater is generated from at least one graywater source in a building. The method includes the following steps of: controlling, by a controller, recovery and reuse of the graywater (S501); recovering, by a graywater recovery device in communication connection with the controller, the graywater from the graywater source of the building (S502); and distributing, by a graywater distributor in communication connection with the controller and communicated with the graywater recovery device, the recovered graywater to at least one target position in the building for reuse (S503). The controller controls the graywater recovery device to deliver the graywater to the graywater distributor according to a control signal sent by a user, and the controller controls the graywater distributor to deliver the graywater to a target position designated by the user for reuse according to a control signal sent by the user.

In an embodiment, the method further includes preprocessing, by a graywater processing device in communication connection with the controller, the graywater before reusing the graywater (S504). The graywater processing device is mounted in an upstream position of the graywater recovery device, between a downstream position of the graywater recovery device and an upstream position of the graywater distributor, in a downstream position of the graywater distributor, in at least one graywater source in the building and/or the target position.

In an embodiment, the at least one graywater source in the building includes: kitchen residual wastewater, hand washing sink wastewater, shower/bath wastewater, washing machine wastewater, refrigerator wastewater, irrigation wastewater and/or Islamic Ghusl/Wudu wastewater.

In an embodiment, the method further includes controlling, by the controller, the graywater distributor to distribute the graywater according to a cleanliness of the graywater required by a reuse purpose and a cleanliness of the graywater source (S505). When a cleanliness of the graywater required by a certain purpose is lower than the cleanliness of the graywater source, the graywater source is capable of being used for the purpose.

The recovery and reuse of the graywater of the present disclosure are described in more detail hereinafter with reference to accompanying drawings according to the generation source of the graywater in the building and the reuse purpose of the graywater.

Recovery and Reuse of Graywater of Sink

The sink is an important source of the graywater in the building. As shown in FIG. 3 to FIG. 10, the sink 200 may include a sink in kitchen and a hand washing sink in restroom. The sink in kitchen is usually used for washing fruits, vegetables and kitchen utensils. Therefore, the kitchen residual wastewater may include peels and leaves remaining in the graywater after washing fruits and vegetables, which usually deposit to the bottom part of the graywater or float on the surface of the graywater. The kitchen residual wastewater may also include grease remaining in the graywater after washing the kitchen utensils, which usually floats on the surface of the graywater. The kitchen residual wastewater may further include a washing agent for washing the fruits, the vegetables and the kitchen utensils, which usually floats on the surface of the graywater or is dissolved in the graywater. Since the kitchen residual wastewater is usually not polluted by feces and urine, the kitchen residual wastewater is reusable graywater. The hand washing sink in restroom is usually used for washing a hand and a face and brushing teeth. Therefore, the hand washing sink wastewater includes a washing agent for washing the hand and the face, and a toothpaste for brushing the teeth. Since the hand washing sink wastewater is usually not polluted by feces and urine, the hand washing sink wastewater is reusable graywater.

As previously mentioned, the controller 110 may distribute the graywater according to the water cleanliness required by the reuse purpose and the cleanliness of the graywater. Since the water cleanliness required for toilet flushing and irrigation is lower than the cleanness of the graywater generated from the sink, the graywater generated from the sink may be used for toilet flushing and irrigation.

Figure 8:
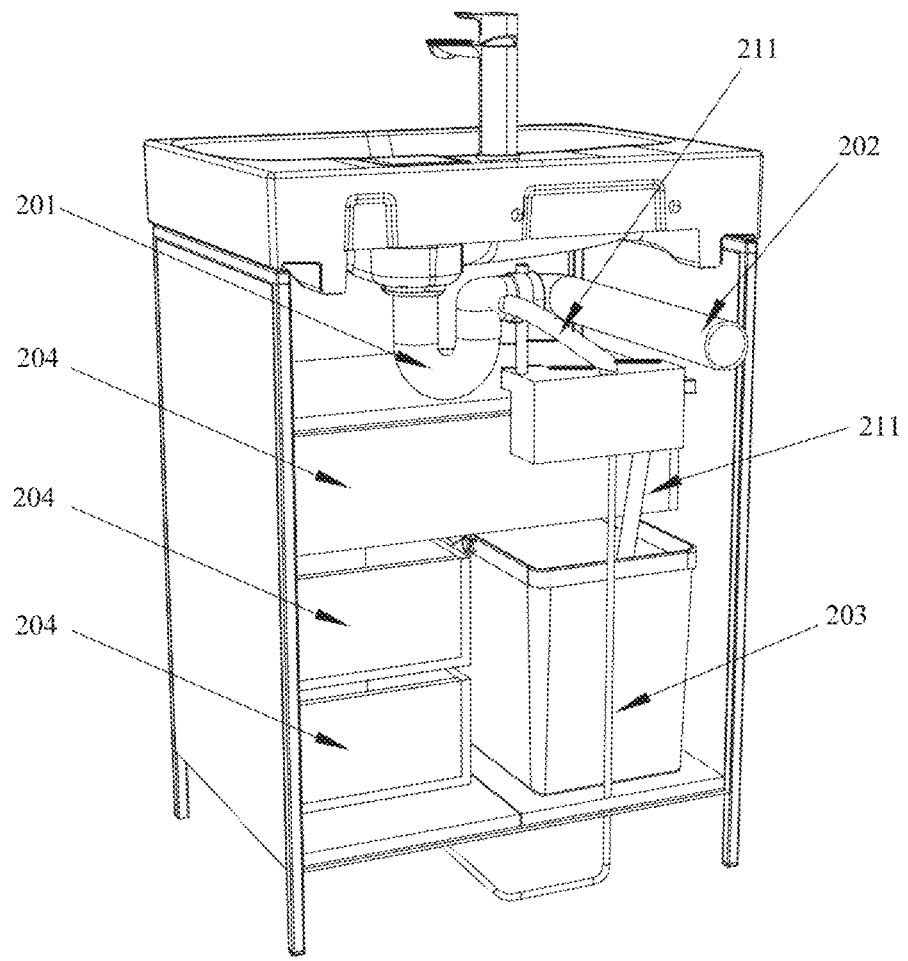
Figure 9:
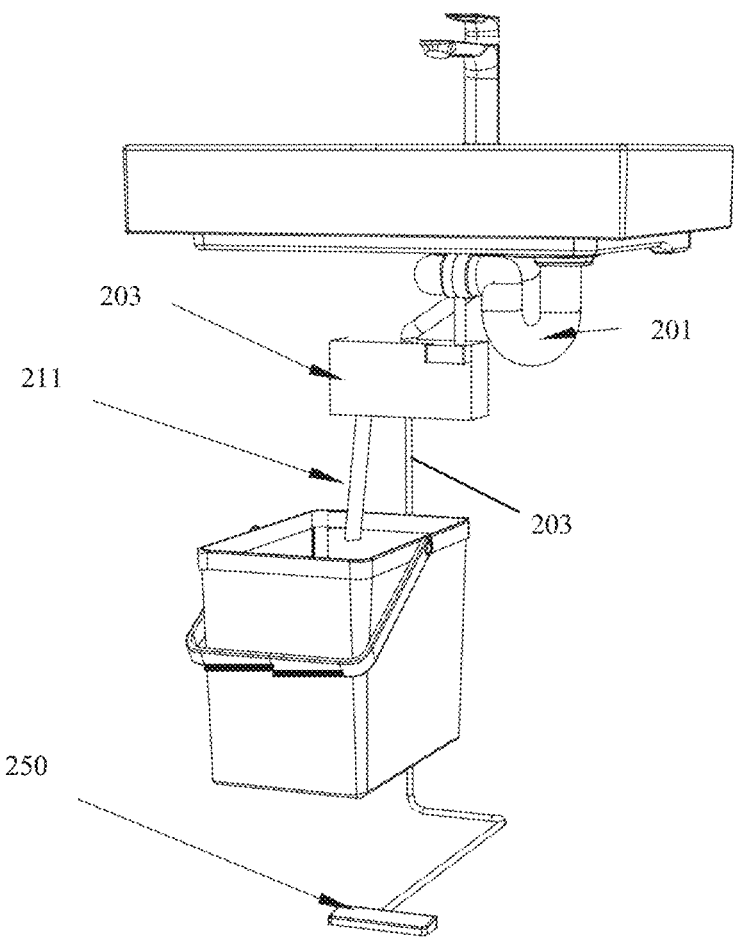
Figure 10:
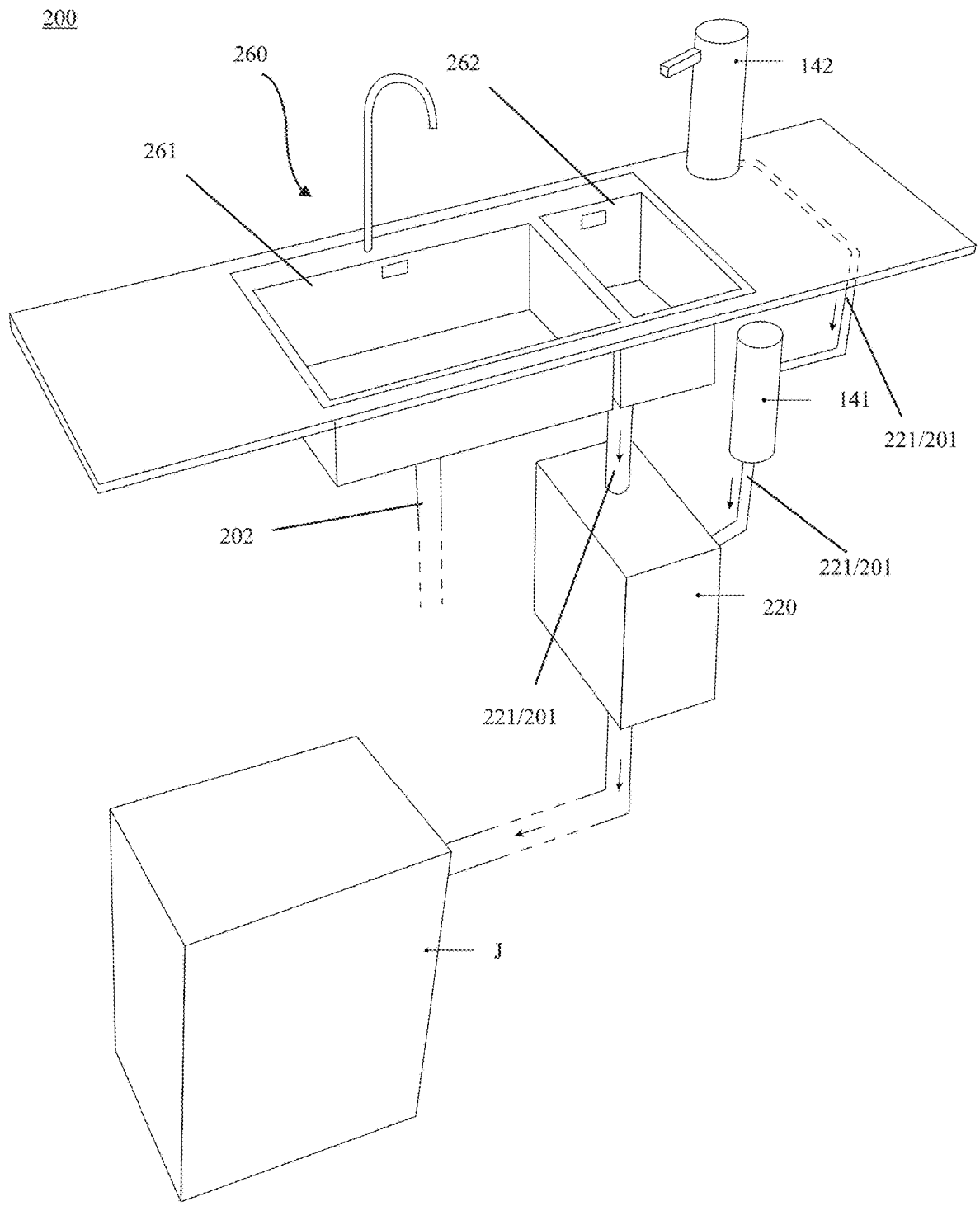
Figure 11:
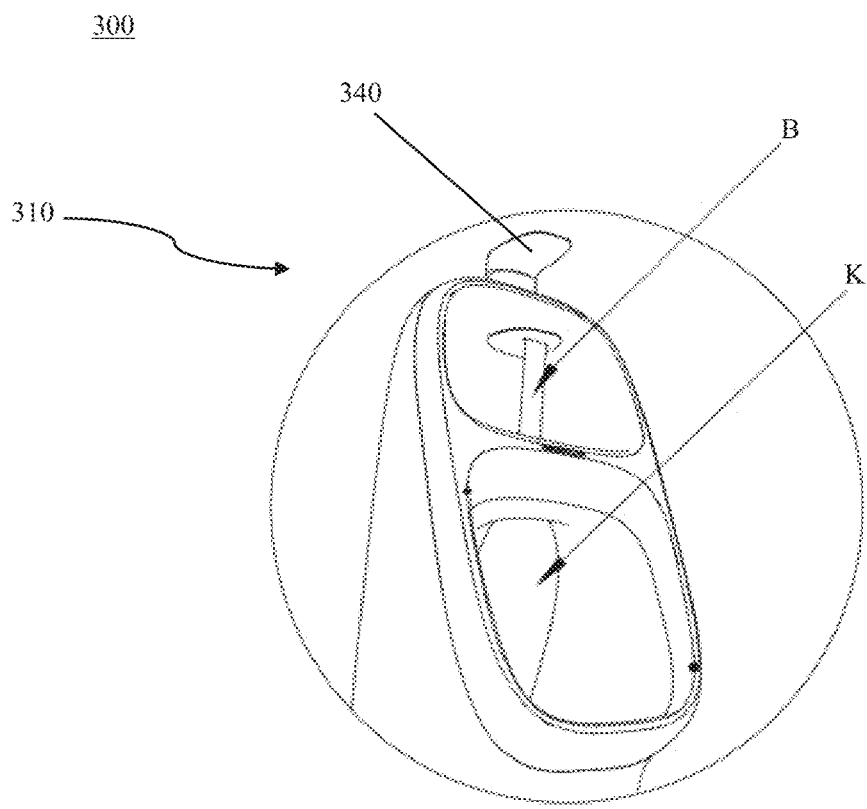
FIG. 11 to FIG. 14 show a male urinal applied to a system for recovering and reusing graywater according to an embodiment of the present disclosure.
Figure 12:
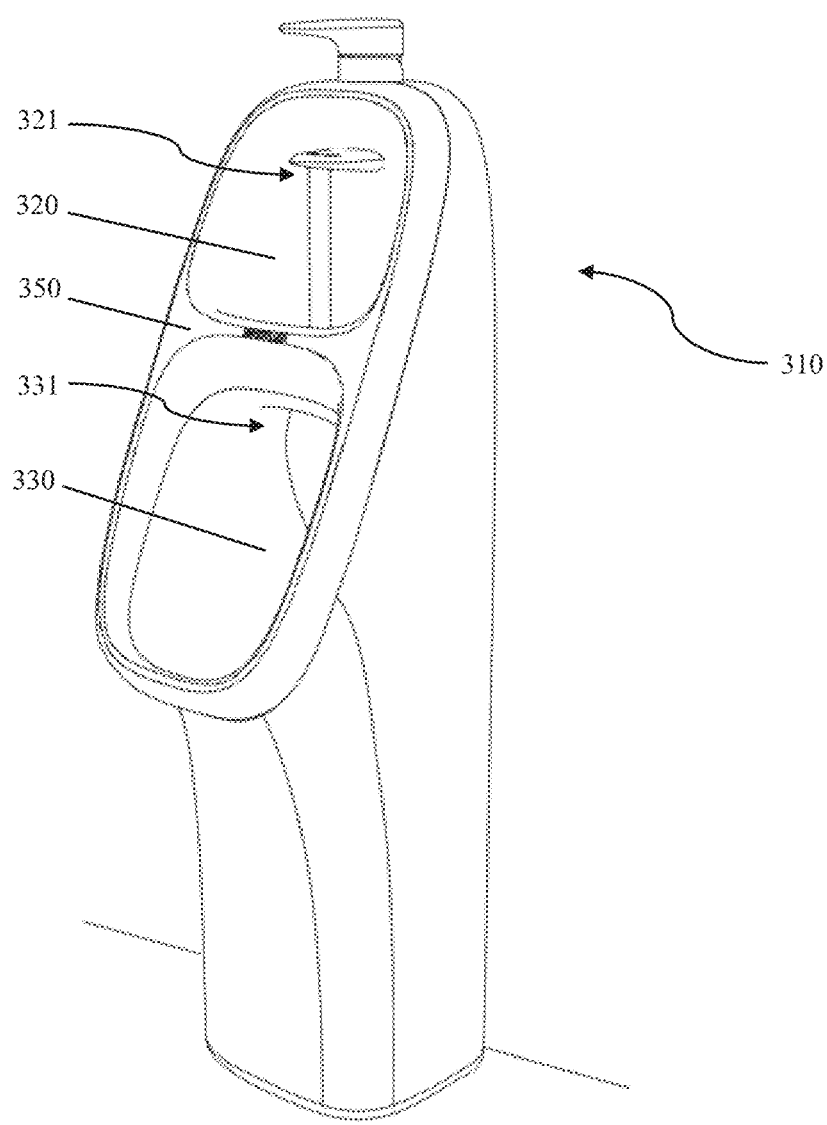
Figure 13:
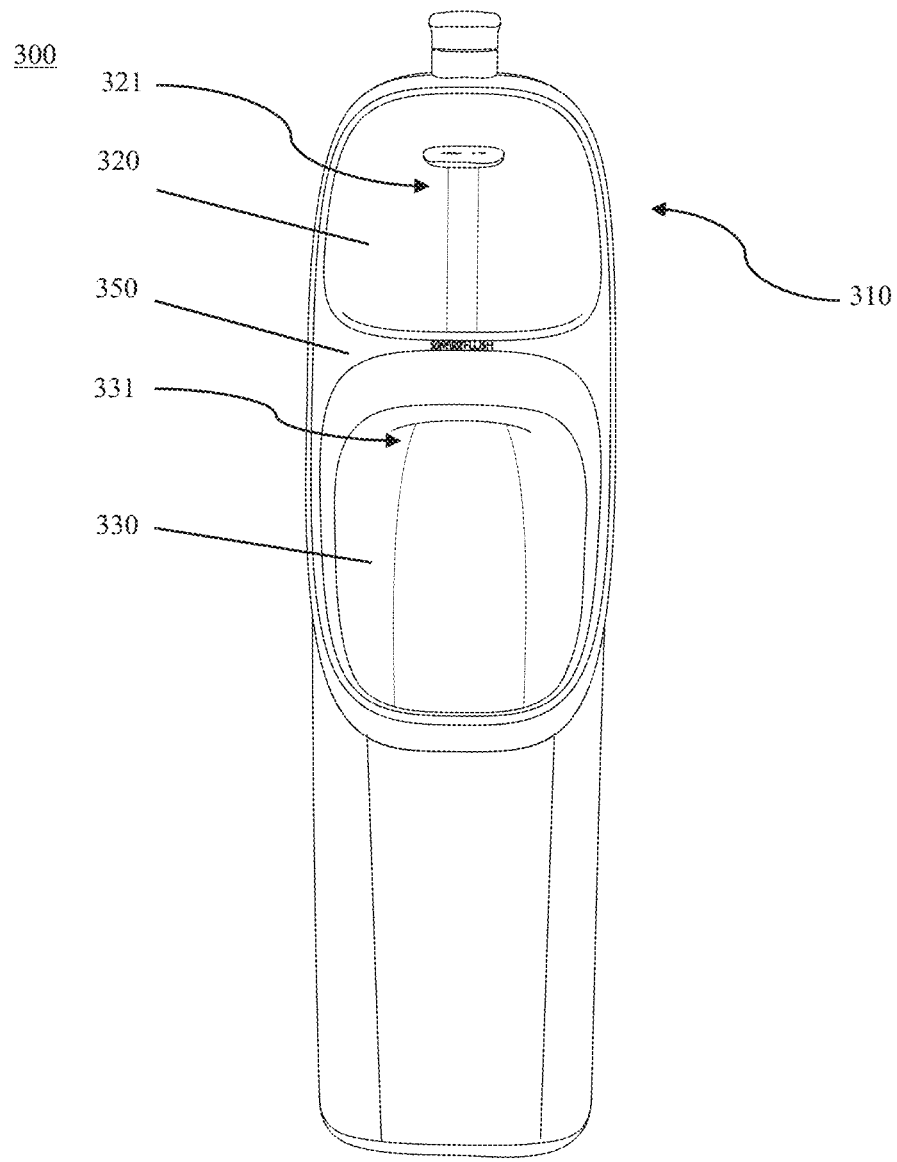
Figure 14:
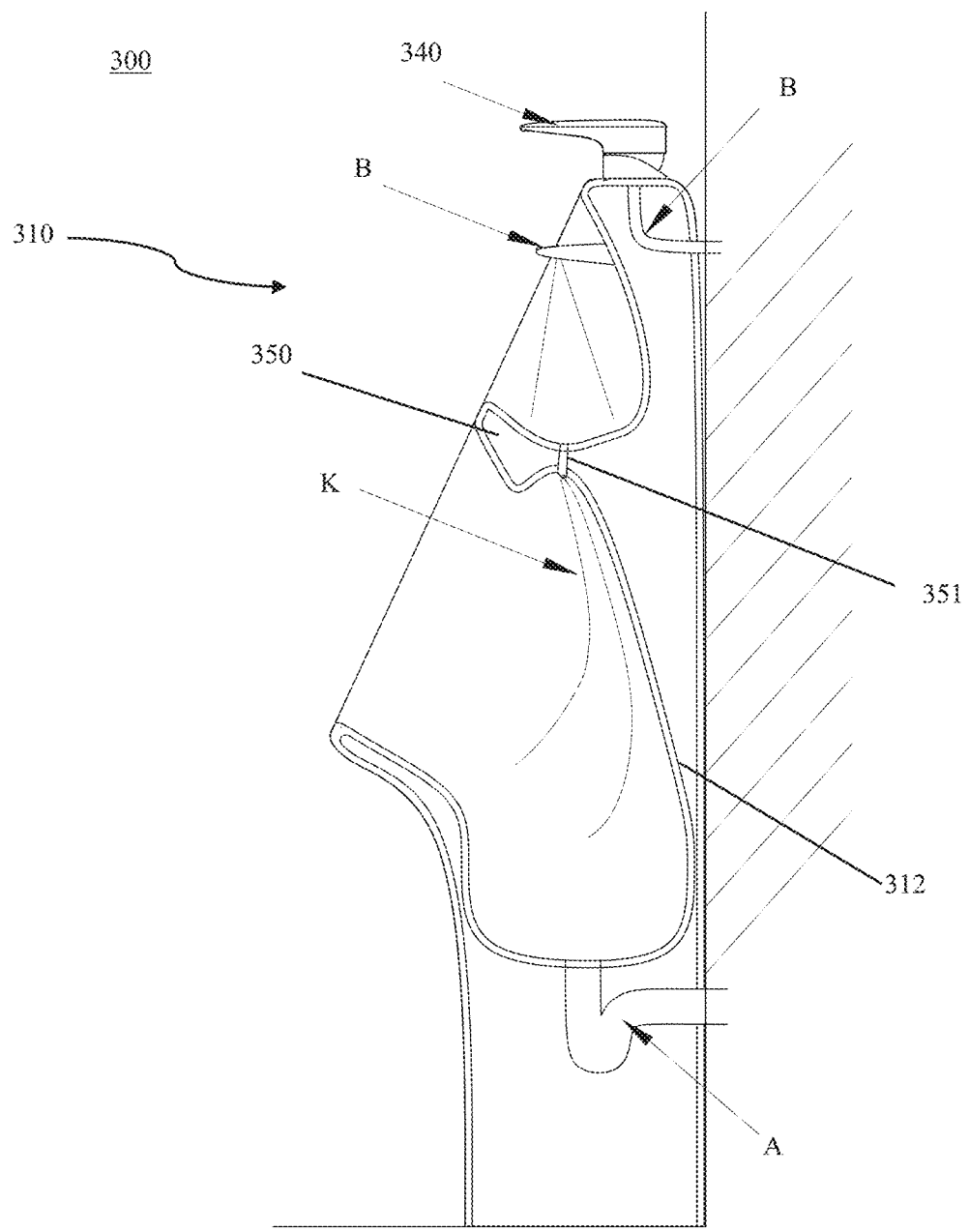
Figure 15:
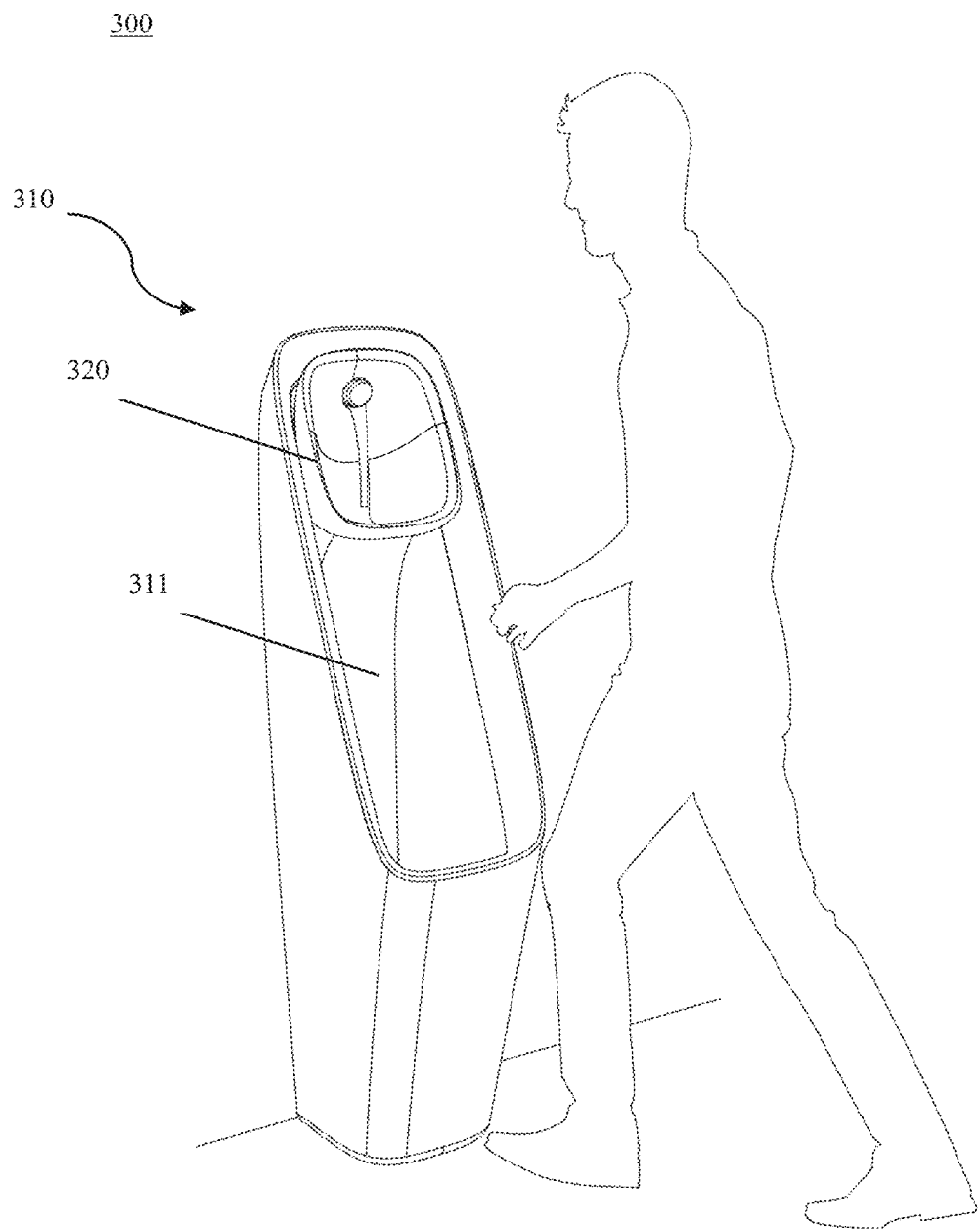
FIG. 15 to FIG. 18 show a male urinal applied to a system for recovering and reusing graywater according to another embodiment of the present disclosure.
Figure 16:
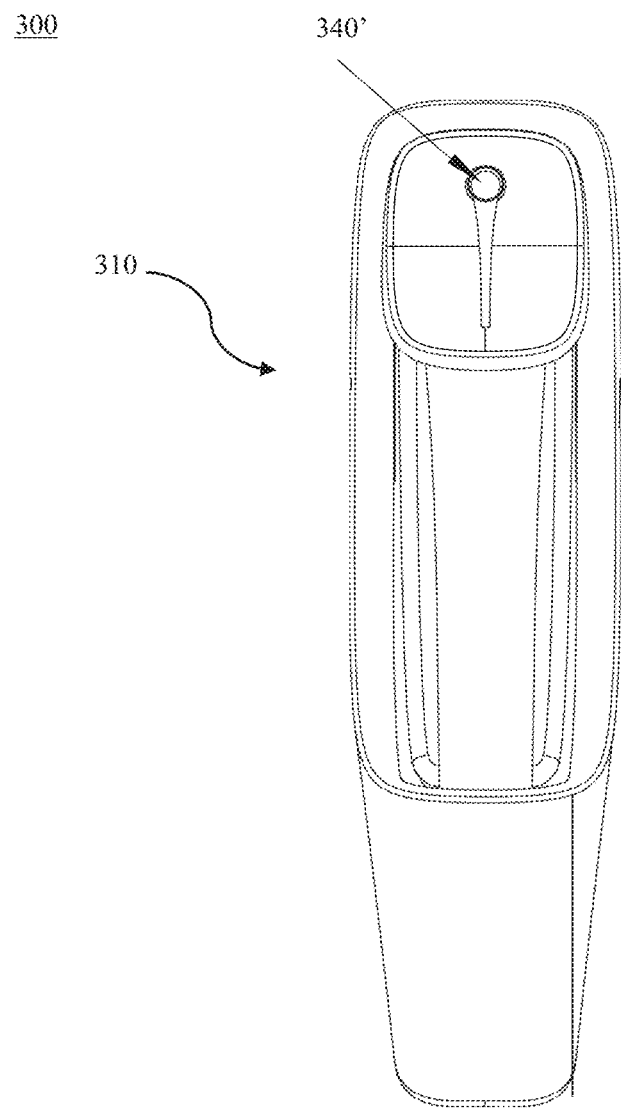
Figure 17:
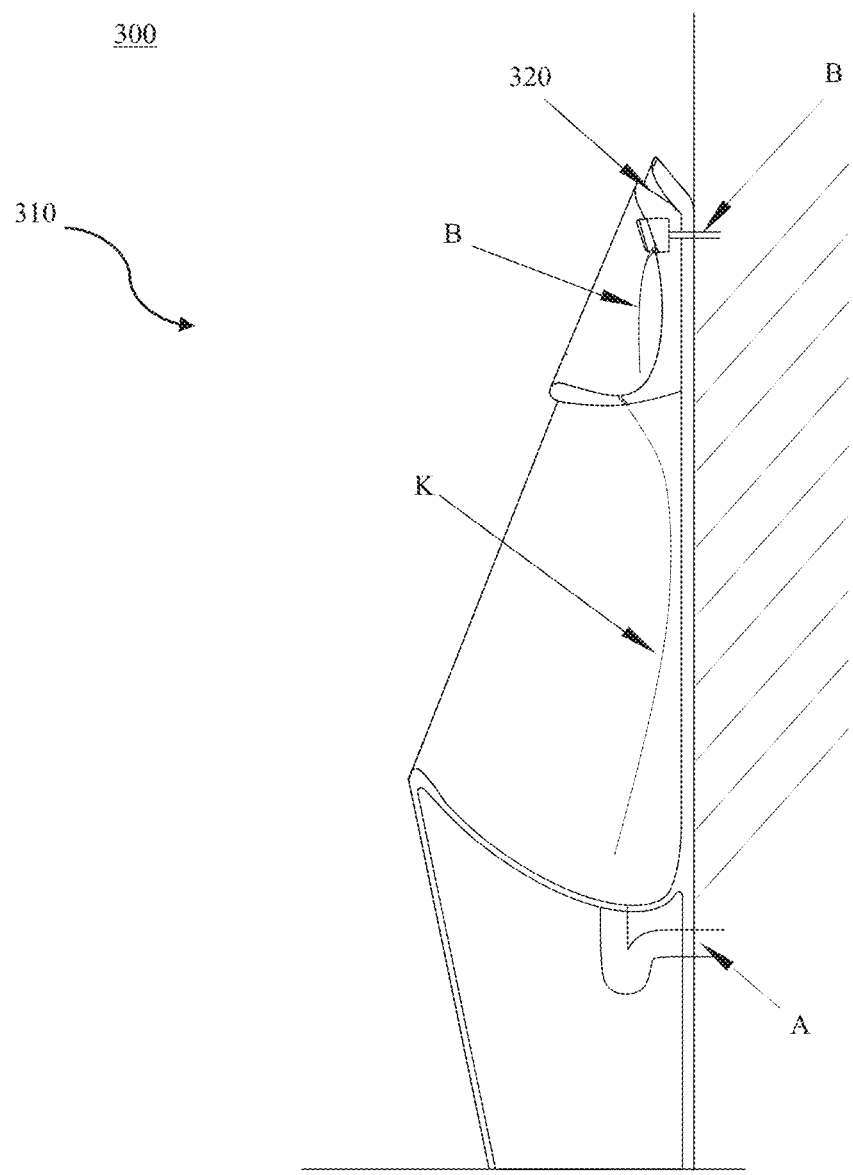
Figure 18:
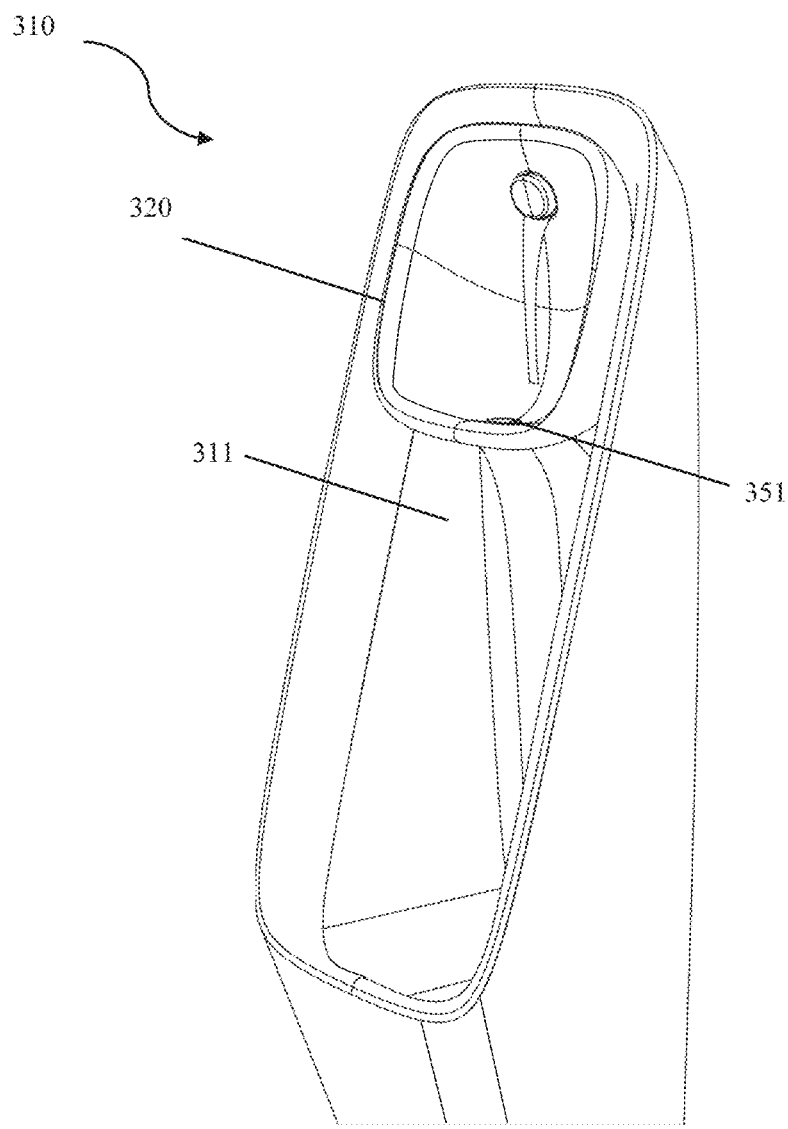
Figure 19A:
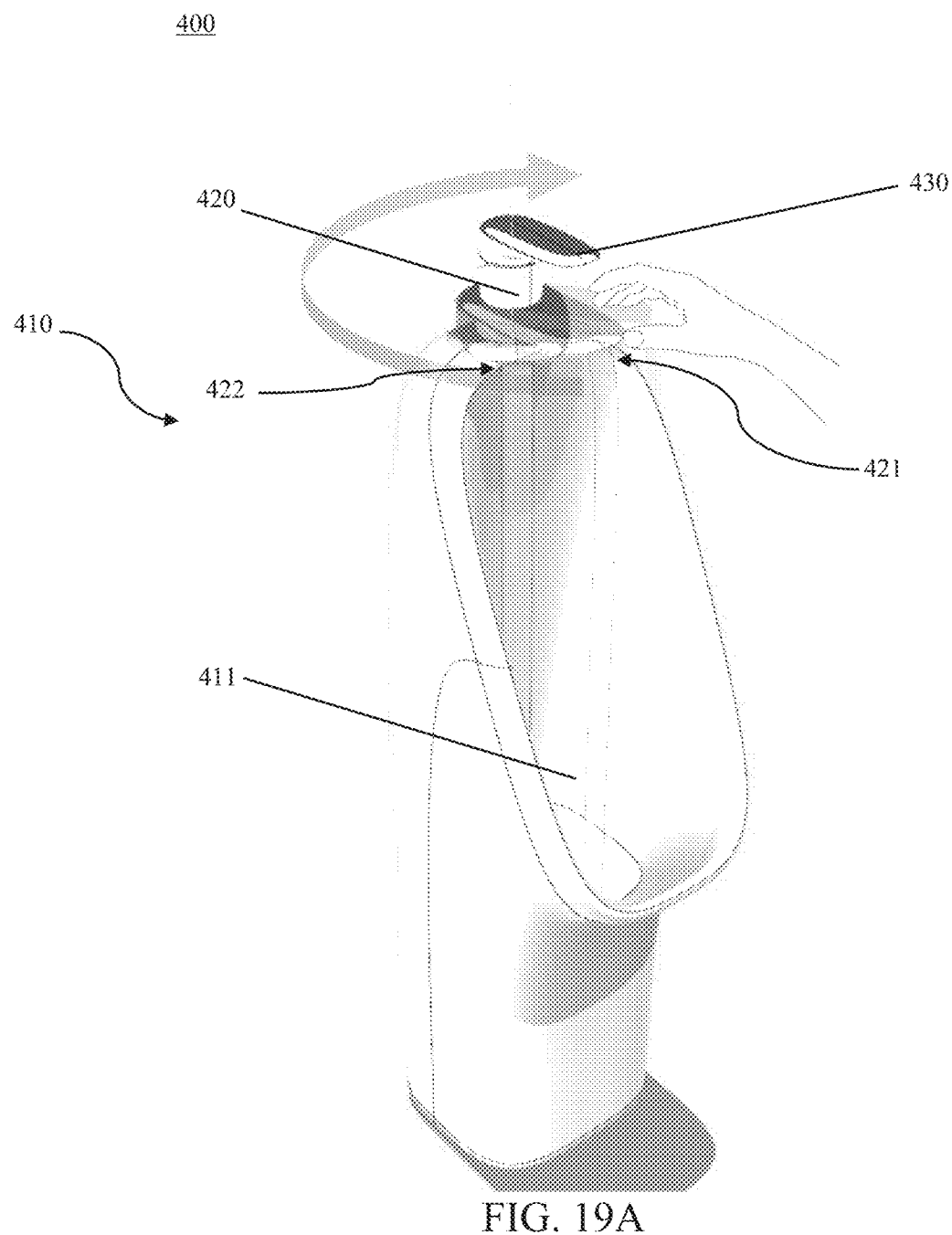
FIG. 19A, FIG. 19B, FIG. 20A, and FIG. 20B show a male urinal applied to a system for recovering and reusing graywater according to another embodiment of the present disclosure.
Figure 19B:
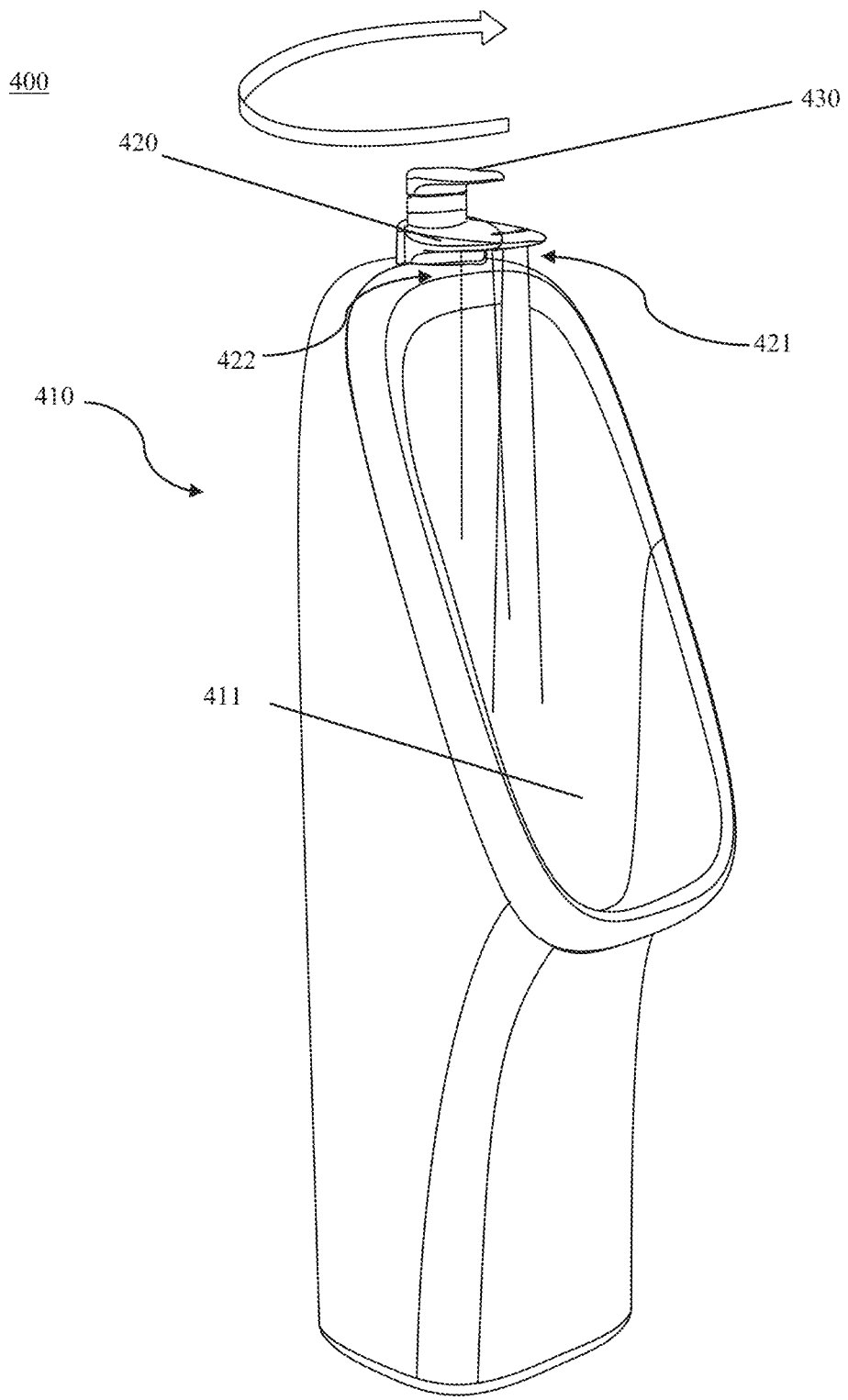

The sink 200 shown in FIG. 3 to FIG. 10 may cooperate with the system 100 for collecting and reusing graywater. As shown in FIG. 10, the sink 200 includes a sink body 210, a sink graywater recovery device 220, and a sink graywater recovery pipeline 211/drainage pipeline 201 connected between the sink body 210 and the sink graywater recovery device 220. The sink 200 may comprise a nested design. The sink graywater recovery pipeline 211/the drainage pipeline 201 is in through connection with the sink graywater recovery device 220, so as to lead the at least a part of the graywater into the sink graywater recovery device 220. The sink graywater recovery device 220 may be connected with the discharge pipeline 121 (as shown in FIG. 1) of the system 100 for collecting and reusing graywater. The sink graywater recovery device 220 is communicated with a domestic water tank J, so that graywater generated by domestic water J is recovered in the domestic water tank J. In another embodiment, the sink graywater recovery pipeline 211/the drainage pipeline 201 may be connected with the sewer 202, so as to discharge at least a part of graywater into the sewer 202. The dirty wastewater, grease, and/or other impurities, which cannot be reused, may also enter the sewer 202. In the embodiment shown in FIG. 10, the sink in kitchen and/or the hand washing sink in restroom may include double water basins 260, and at least a part of graywater is discharged into the sewer 202 through an additionally arranged water basin (described in detail hereinafter).

The recovery of the graywater may be implemented indirectly or directly. In this embodiment, when the kitchen residual wastewater and the hand washing sink wastewater are generated in the sink body 210, the graywater passes through the sink graywater recovery pipeline 211 under an action of gravity and is stored in the sink graywater recovery device 220. The user may discharge the graywater stored in the sink graywater recovery device 220 to the graywater recovery device 120 (as shown in FIG. 1) through the discharge pipeline 121 (as shown in FIG. 1) via the user control interface of the controller 110 or the user control interface of a separate controller (not shown in the drawings), so as to indirectly recover the graywater. In another embodiment, when the kitchen residual wastewater and the hand washing sink wastewater are generated, the graywater are directly recovered by the graywater recovery device 120 through the discharge pipeline 121 without passing through the sink graywater recovery device 220.

The user may select a way to recover and discard the graywater. In an embodiment, the user may select to directly discard the graywater or recover the graywater via the user control interface of the controller 110 or the user control interface of a separate controller (not shown in the drawings). The controller 110 or the separate controller may control a switcher (not shown in the drawings), so that the user may switch between the recovery of the graywater and the direct discarding of the graywater. In the embodiment shown in FIG. 10, the sink in kitchen and/or the hand washing sink in restroom may include double water basins 260, which are namely a first water basin 261 and a second water basin 262. The first water basin 261 is in through connection with the sewer 202, so that the graywater in the first water basin 261 is led into the sewer and discarded. The second water basin 262 is in through connection with the sink graywater recovery device 220 via the sink graywater recovery pipeline 211/the drainage pipeline 201, so as to lead the graywater in the second water basin 262 into the sink graywater recovery device 220. Therefore, the user may select to directly discard the graywater by selecting the corresponding water basin for operation. When the user selects the first water basin 261 for operation, such as washing very greasy dishes, since the generated graywater is not suitable for reuse, the graywater will be directly discarded through the sewer 202. When the user selects the second water basin 262 for operation, such as washing fruits, vegetables, kitchen utensils, hands, a face, and teeth, since the generated graywater has a higher cleanliness, the graywater is stored in the sink graywater recovery device 220 for reuse. The user may discharge the graywater stored in the sink graywater recovery device 220 to the graywater recovery device 120 (as shown in FIG. 1) through the discharge pipeline 121 (as shown in FIG. 1) via the user control interface of the controller 110 or the user control interface of the separate controller (not shown in the drawings), so as to recover the graywater.

The user may select whether the graywater needs to be recovered and whether the graywater needs to be preprocessed. In an embodiment, the user may select whether the generated graywater needs to be recovered via the user control interface of the controller 110 or the user control interface of the separate controller (not shown in the drawings). When the graywater is too muddy to be reused, the user may directly discharge the graywater into the sewer 202. For example, after washing greasy kitchen utensils, the graywater contains a lot of grease. The user may distinguish by naked eyes that the graywater is not suitable for reuse. When the graywater is not suitable for reuse, the user may select to preprocess the graywater instead of directly discharging the graywater into the sewer 202, so as to reach a reuse standard. When the graywater is suitable for reuse, the user may still select to preprocess the graywater (such as the RO device 141 and/or the filtering device 142), so as to make the graywater cleaner. A way and a device for preprocessing are as described above, which are not repeated herein. In another embodiment, when the graywater contains a substance beneficial for reuse, the user may select not to preprocess the graywater. For example, the graywater may include soapy water generated by hand washing, thus being beneficial for toilet flushing.

Further, with reference to FIG. 3 and FIG. 6 to FIG. 9, the sink 200 includes the sink body 210, which includes a water basin located at an upper part of the sink body and a cavity located at a lower part of the sink body, wherein the water basin includes a water outlet. The sink 200 includes the drainage pipeline 201 in through connection with the water outlet of the water basin. The other end of the drainage pipeline 201 is in through connection with the sink graywater recovery pipeline 211. The sink 200 further includes a switching device 230, which is arranged on the drainage pipeline 201, the sewer 202, or the sink graywater recovery pipeline 211, and is used for switching between the sewer 202 and the sink graywater recovery pipeline 211. The user may switch between leading the graywater into the sewer 202 to discard the graywater and leading the graywater into the sink graywater recovery pipeline 211 to reuse and/or preprocess the graywater via the switching device 230. The switching device 230 includes a valve and/or a divertor. When the switching device 230 opens the sewer 202 and closes the sink graywater recovery pipeline 211, the graywater is led into the sewer and discarded. When the switching device 230 opens the sink graywater recovery pipeline 211 and closes the sewer 202, the graywater is led into the sink graywater recovery pipeline 211, and reused and/or preprocessed. In another embodiment, the sink 200 further includes the one-way valve (not shown in the drawings) capable of being mounted on the sink graywater recovery pipeline 211 and cooperating with the switching device 230 to prevent the graywater led into the sink graywater recovery pipeline 211 from flowing back into the drainage pipeline 201. In another embodiment, the one-way valve is capable of being mounted on the sewer 202 and cooperating with the switching device 230 to prevent the graywater led into the sewer 202 from flowing back into the sink graywater recovery pipeline 211.

Using Sink as a Target Position of Reuse of Graywater

Figure 7:
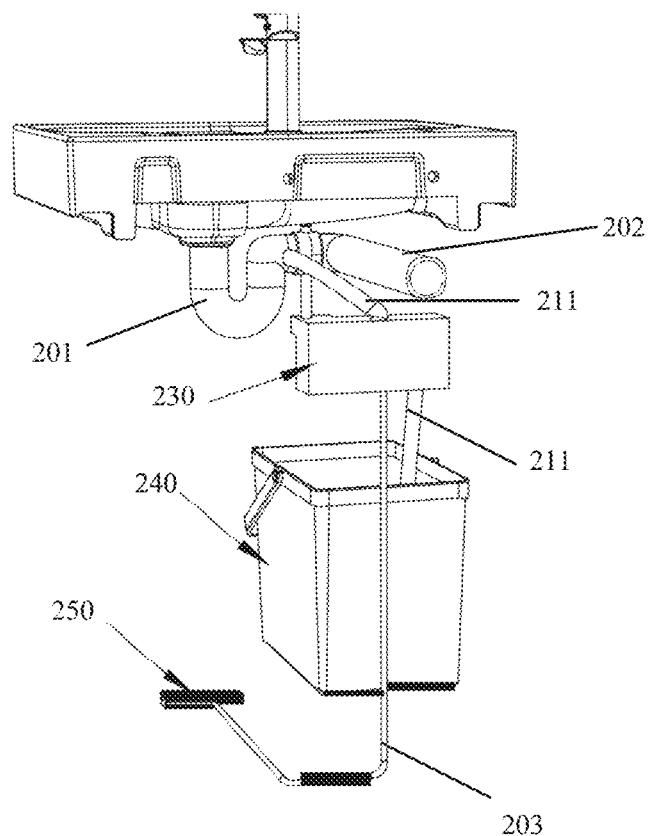

The sink 200 may be used as the target position of the reuse of the graywater. In an embodiment, the recovered graywater may be used for washing fruits, vegetables, kitchen utensils, hands and face and/or brushing teeth in the sink 200. In another embodiment, as shown in FIG. 3 to FIG. 9, the recovered graywater may be used for Islamic Wudu in the sink 200. In another embodiment, the recovered graywater may be used for toilet flushing. The sink 200 includes a foot washing device 240 and a pedal device 250 connected with the washing device 240. The washing device 240 is a drawer-type device comprising at least one drawer 204, which is movably/slidably extended from the cavity of the sink body 210, so as to open the washing device 240, or is movably/slidably retracted in the cavity of the sink body 210 to close the washing device 240. When people who believe in Islam (which are namely the users) need to wash a foot, the freshwater (such as the tap water) or the graywater is injected into the washing device 240 placed in the sink body 210. In an embodiment, the pedal device 250 may be used for controlling the injection of the freshwater or the graywater and/or opening and closing of the washing device 240 through a control line 203 (as shown in FIG. 7 to FIG. 9). In another embodiment, when the user steps on the pedal device 250, the pedal device 250 may inject a certain or designated amount of freshwater or graywater into the washing device 240. When the injection is finished, the user may open the washing device 240 by stepping on the pedal device 250 again. In another embodiment, the pedal device 250 may inject the freshwater or the graywater into the washing device 240 for a period of time, such as 15 seconds. When the injection is finished, the pedal device 250 may automatically open the washing device 240. When the washing device 240 is opened, the user may extend a foot into the washing device 240 to wash the foot, so as to meet a requirement of Wudu for foot washing.

In another embodiment, the switching device 230 and the pedal device 250 may be used for controlling whether the graywater is injected into the washing device 240. The sink 200 includes the sink body 210, which includes the water basin located at the upper part of the sink body and the cavity located at the lower part of the sink body, wherein the water basin includes a water outlet. The sink 200 includes the drainage pipeline 201, and a first end of the discharge pipeline is in through connection with the water outlet of the water basin. A second end of the drainage pipeline 201 is in through connection with the sink graywater recovery pipeline 211 and the sewer 202. The sink 200 further includes the switching device 230, which is arranged on the drainage pipeline 201, the sewer 202, or the sink graywater recovery pipeline 211, and is used for switching between the sewer 202 and the sink graywater recovery pipeline 211. The user may control the switching device 230 by stepping on the pedal device 250 to switch between leading the graywater into the sewer 202 to discard the graywater and leading the graywater into the washing device 240 for the user to wash the foot. In another embodiment, when the washing device 240 is filled fully with the graywater, the switching device 230 may automatically stop the injection of the graywater.

The graywater injected into the washing device 240 may include unused or slightly used freshwater (such as tap water), which is namely graywater with a higher cleanliness. The slightly used freshwater (such as the tap water) includes graywater generated by hand washing. When the switching device 230 opens the sink graywater recovery pipeline 211 and closes the drainage pipeline 201, the water source for foot washing is a water source led into the sink graywater recovery pipeline 211. In another embodiment, the sink 200 may cooperate with the system 100 for collecting and reusing graywater. The graywater may be graywater recovered by the graywater recovery device 120 or preprocessed by the graywater processing device 140. In another embodiment, the graywater may be directly led into the washing device 240 via the sink graywater recovery pipeline 211 for the user to wash the foot without being recovered by the graywater recovery device 120 or preprocessed by the graywater processing device 140. As previously mentioned, the one-way valve is used for preventing the graywater from flowing back.

The user may select how to process the graywater obtained after foot washing/Wudu. After finishing foot washing/Wudu, the user may push the washing device 240 into the sink body 210, so as to close the washing device 240. In another embodiment, the user may close the washing device 240 by stepping on the pedal device 250 again. Since the graywater obtained after foot washing/Wudu still has a higher cleanliness, the graywater obtained after foot washing/Wudu may still be reused as graywater, including toilet flushing, irrigation, etc. For example, the kitchen residual wastewater contains an organic matter, thus being beneficial for irrigating flowers and plants after recovery.

The recovery and reuse of the graywater of the sink may be implemented by the above device and method. Those skilled in the art should understand that the above device and method are also applicable to other embodiments as described below. Other embodiments described below focus on the differences from the above embodiments; and the similarities are not repeated herein.

Recovery and Reuse of Graywater of Male Urinal

In the building, the wastewater generated from the male urinal cannot be reused as the graywater like the toilet wastewater. The reason is that the wastewater obtained by urinal flushing may carry pathogens in urine, and reuse of the graywater polluted by urine may lead to spread of the pathogens. To this end, a double water outlet design is used in the male urinal of the present disclosure, and the wastewater without being polluted by urine generated from the male urinal of the present disclosure may still be recovered and reused as the graywater.

Specifically, as shown in FIG. 11 to FIG. 18, the male urinal 300 includes a urinal body 310, a water basin 320 located at an upper part of the urinal body 310, a urine basin 330 located at a lower part of the urinal body 310, and a handle 340 located at a top face of the urinal body 310. The male urinal 300 shown in FIG. 11 to FIG. 14 is an integral design: the water basin 320 at the upper part and the urine basin 330 at the lower part are two grooves, which are recessed from a front end face of the urinal body 310 to a rear end face of the urinal body 310 in upper and lower part positions of the urinal body 310 respectively, so as to save an occupied space. The recessed water basin 320 and urine basin 330 naturally form a partition face 350 at lower and upper end faces of the water basin and the urine basin (which are namely a joint of two recesses). A drainage port 351 is arranged on the partition face 350. The male urinal 300 shown in FIG. 15 to FIG. 18 adopts a stand-alone type design: the urinal body 310 includes a groove 311, the water basin 320 is mounted in an upper part position of the groove 311 of the urinal body, so as to form the urine basin 330 in a lower part position of the groove 311 of the urinal body.

As shown in FIG. 11 to FIG. 14, the male urinal 300 may adopt a double water outlet design: the water basin 320 includes a first water outlet 321 arranged below the top face of the urinal body 310, and the urinal basin 330 includes a second water outlet 331 arranged below the partition face 350. The user may open the water source (e.g. freshwater or tap water B) of the first water outlet 321 via the handle 340. Since the first water outlet 321 is used for washing the hand of the user, the wastewater generated after hand washing or Wudu K is usually not polluted by feces and urine, and may be recovered, reused and preprocessed as the graywater. The wastewater generated after hand washing or Wudu K may be directly discharged into the urinal basin 330 through the second water outlet 331 and the drainage port 351, so as to finish flushing the urinal basin 330. The device and method for recovering, reusing and preprocessing graywater refer to contents as described above, which are not repeated herein. In another embodiment shown in FIG. 15 to FIG. 18, the first water outlet 321 is arranged below the top face of the water basin 320. The second water outlet 331 is arranged below a bottom face of the water basin 320. The first water outlet 321 is used for washing the hand of the user, so as to finish daily hand washing and/or meet a requirement of Islamic Wudu for hand washing. The second water outlet 331 is used for flushing the urinal basin 330. In this embodiment, the male urinal 300 does not need to include the handle 340, and the user may open the water source of the first water outlet 321 in a non-contact manner through a sensing device 340', so as to prevent the pathogens from being spread through the handle 340. The wastewater generated after hand washing or Wudu may be directly discharged into the urinal basin 330 through the second water outlet 331, so as to finish flushing the urinal basin 330.

The recovery and reuse of the graywater of the water basin 320 may be implemented by the above device and method. The water basin 320 may be mounted separately.

Using Male Urinal as a Target Position of Reuse of Graywater

The male urinal 300 may be used as the target position of the reuse of the graywater. As shown in FIG. 11 to FIG. 18, the male urinal 300 includes the first water outlet 321 used for washing the hand of the user, so as to finish daily hand washing and/or meet a requirement of Islamic Wudu for hand washing. The water source of the first water outlet 321 includes unused or slightly used freshwater (such as tap water) B, which is namely graywater with a higher cleanliness. In an embodiment, the male urinal 300 may cooperate with the system 100 for collecting and reusing graywater for use. The user may switch the water sources through the switching device (not shown in the drawings) and/or the one-way valve (not shown in the drawings). The switching device may be connected with a tap water pipeline (not shown in the drawings) and the pipeline for reusing water 131. When the switching device opens the tap water pipeline and closes the pipeline for reusing water 131, the freshwater (such as the tap water) is led into the first water outlet 321 for the user to wash the hand/perform Wudu. When the switching device opens the pipeline for reusing water 131 and closes the tap water pipeline, the graywater distributed by the graywater distributor 130 is led into the first water outlet 321 for the user to wash the hand/perform Wudu. Since there is a high requirement for a cleanliness of a water source for hand washing/Wudu (such as a cleanliness higher than that of a water source for foot washing), the controller 110 may select wastewater with a relatively high cleanliness (such as water generated by the washing machine in a final washing procedure) to be led into the first water outlet 321 through the pipeline for reusing water 131. As previously mentioned, the one-way valve may be used for preventing the graywater from flowing back.

The user may select how to process the graywater obtained after hand washing/Wudu. The graywater generated after hand washing/Wudu may be directly discharged into the urinal basin 330 through the drainage port 351 and the second water outlet 331, so as to finish flushing the urinal basin 330. In another embodiment, since the graywater obtained after hand washing/Wudu still has a relatively high cleanliness, the graywater obtained after hand washing/Wudu may still be reused as the graywater, such as toilet flushing, irrigation, etc.

As shown in FIG. 11 to FIG. 18, the male urinal 300 includes the second water outlet 331 for flushing the urinal basin 330, so as to finish flushing the urinal basin 330. As previously mentioned, the controller 110 may distribute the graywater according to a water cleanliness required by a reuse purpose and a cleanliness of the graywater. When a cleanliness required by a certain purpose is lower than the cleanliness of the graywater, the graywater is capable of being used for the purpose. A cleanness required to flush the urinal is the lowest, so that all other sources of graywater may be used for flushing the urinal basin 330. As mentioned above, the user may switch the water sources through the switching device (not shown in the drawings) and/or the one-way valve (not shown in the drawings). The device and method refer to contents as mentioned above, which are not be repeated herein.

In another embodiment, the male urinal may implement flushing of the urinal and washing of a male private part (such as a urine part). As shown in FIG. 19A, FIG. 19B, FIG. 20A and FIG. 20B, the male urinal 400 includes a urinal body 410, a water outlet device 420 arranged on a top face of the urinal body 410, and a handle 430 connected with the water outlet device 420. The urinal body 410 includes a urinal basin 411 and is used for a male user. The water outlet device 420 is extended from a rear end face of the urinal body 410 to a front end face of the urinal body 410 into an upper part of a space formed by the urinal basin 411. The water outlet device 420 includes a first water outlet 421 located at a front part and a second water outlet 422 located at a rear part. The first water outlet 421 is used for washing the male private part (such as the urine part), so as to finish daily private part washing and/or meet a requirement of Islamic Wudu for private part washing. The second water outlet 422 is used for flushing the urinal basin 411, so as to finish flushing the urinal basin 411.

The user may control water outlet of the water outlet device 420 via the handle 430. In the embodiment shown in FIG. 19A and FIG. 19B, when the user pulls the handle 430 upwardly, the first water outlet 421 and/or the second water outlet 422 may be opened. The handle 430 may be rotated left and right, so as to select to open the first water outlet 421 or the second water outlet 422. For example, when the user pulls the handle 430 to the left, the first water outlet 421 may be opened, so as to finish daily private part washing and/or meet a requirement of Islamic Wudu for private part washing. When the user pulls the handle 430 to the right, the second water outlet 422 may be opened, so as to finish flushing the urine basin 411. In another embodiment shown in FIG. 20A and FIG. 20B, the handle 430 may be pulled back and forth to select to open the first water outlet 421 or the second water outlet 422. For example, when the user pulls the handle 430 forward, the first water outlet 421 may be opened, so as to finish daily private part washing and/or meet a requirement of Islamic Wudu for private part washing. When the user pulls the handle 430 backward, the second water outlet 422 may be opened, so as to finish flushing the urine basin 411. In another embodiment, the first water outlet 421 and the second water outlet 422 may be opened at the same time, so as to finish daily private part washing and/or meet a requirement of Islamic Wudu for private part washing and finish flushing the urine basin 411 at the same time. When the water source of the first water outlet 421 includes the freshwater (such as the tap water) and the water source of the second water outlet 422 includes the graywater, in order to prevent the graywater from polluting the freshwater (such as the tap water), a distance and a relative angle between the first water outlet 421 and the second water outlet 422 can be increased.

Figure 20A:
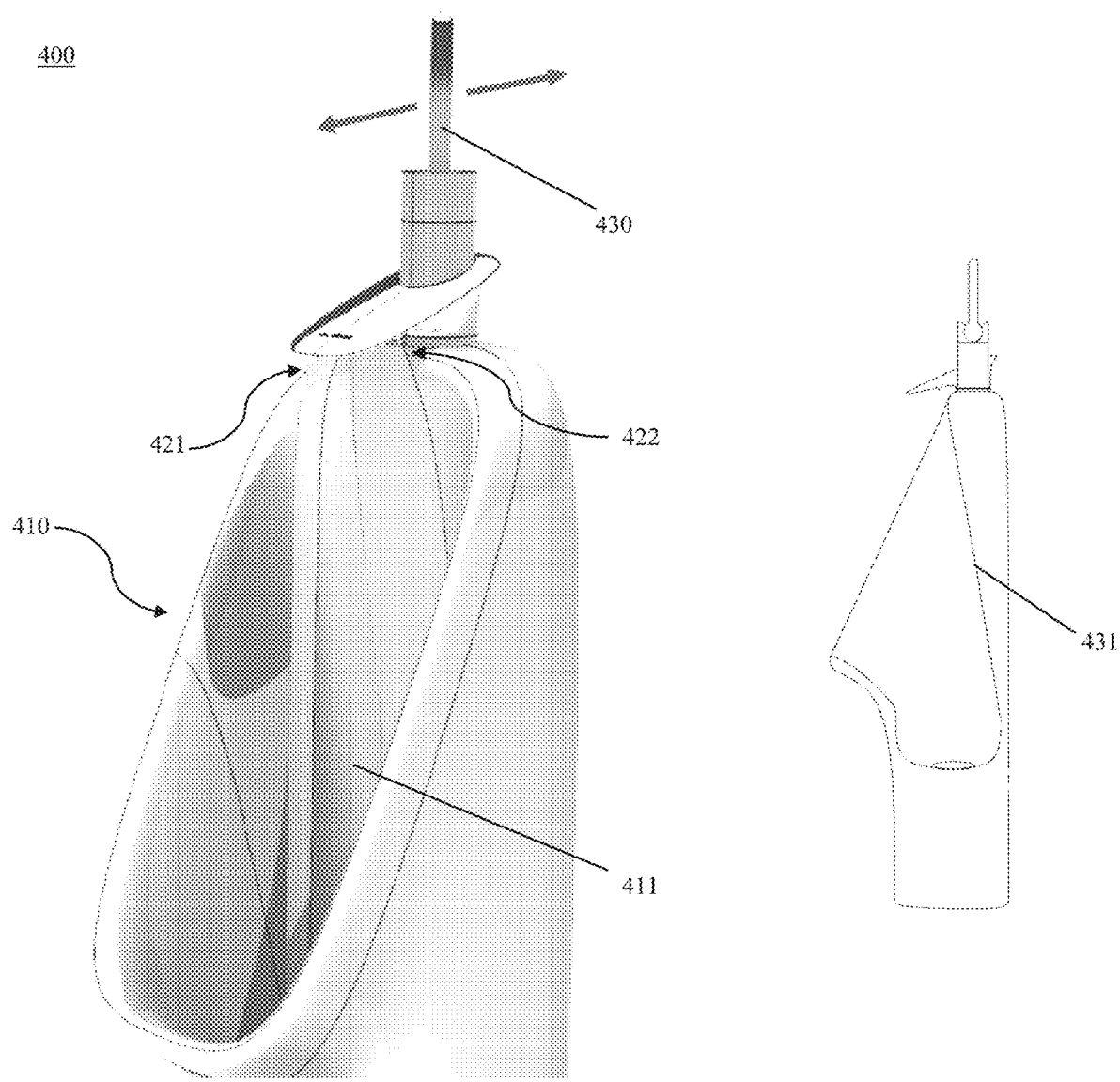
Figure 20B:
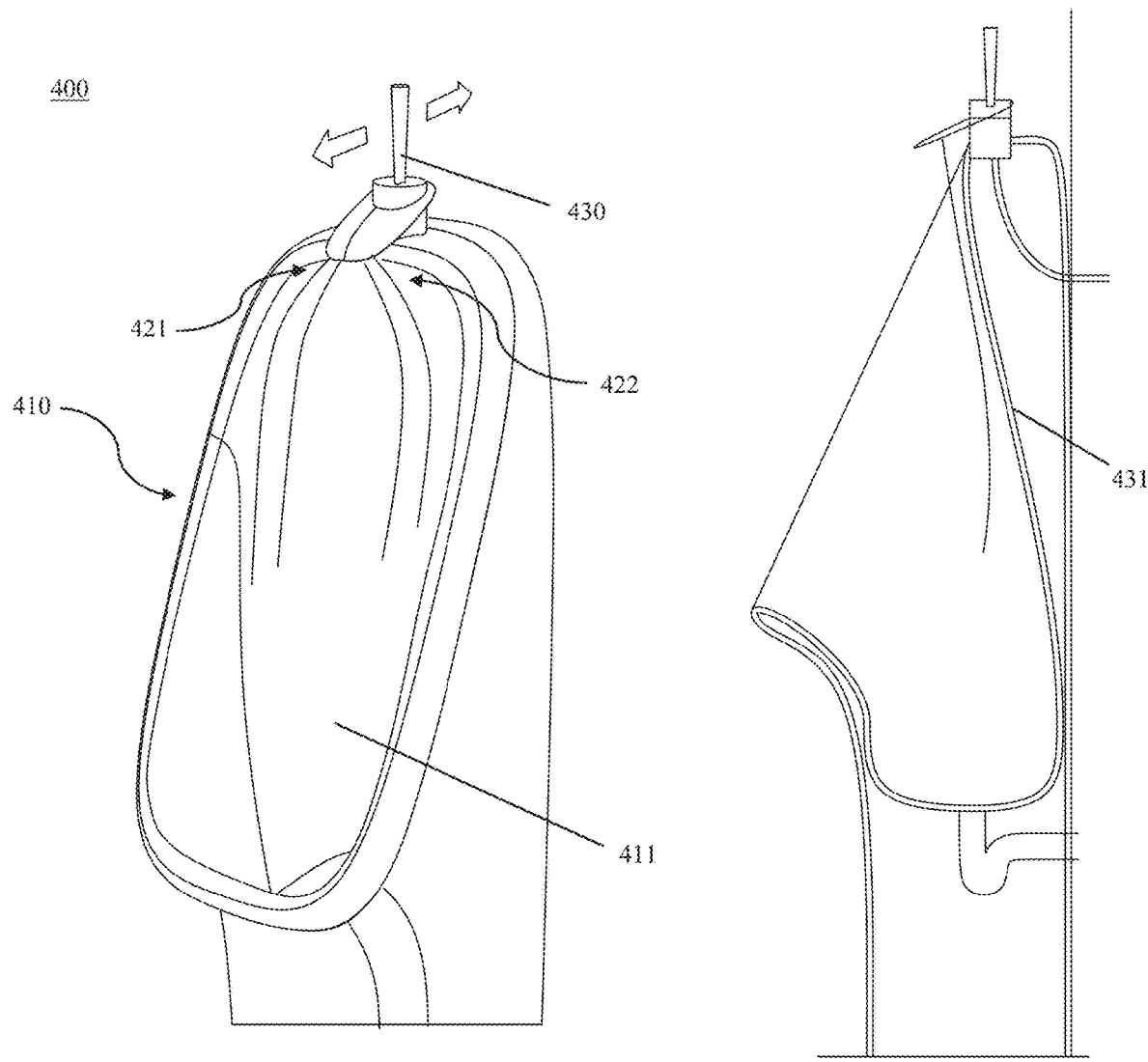

In another embodiment, the rear end face of the urinal basin 330, the rear end face 312 of the urinal body 310, and/or the rear end face 431 of the urinal body 410 (as shown in FIG. 20A and FIG. 20B) are inclined from top to bottom towards a rear side, so as to prevent urine from being splashed on a user by the rear end face when a male user uses the male urinal 300.

Situations of Recovery and Reuse of Other Graywater and Target Position of Reuse of Other Graywater As previously mentioned, the controller 110 may distribute the graywater according to the water cleanliness required by the reuse purpose and the cleanliness of the graywater. When a cleanliness required by a certain purpose is lower than the cleanliness of the graywater, the graywater is capable of being used for the purpose. For example, the required cleanliness from low to high is as follows: toilet/urinal flushing, irrigation, laundering, Islamic Ghusl/Wudu, shower/bath, fruit and vegetable washing, kitchen utensil washing, hand/face washing and teeth brushing, and drinking water/ice making.

The recovery and reuse of other graywater are implemented by the above device and method. In an embodiment, since a water cleanliness required for toilet flushing and irrigation is lower than a cleanness of graywater generated by shower/bath, the graywater generated by shower/bath may be used for toilet flushing and irrigation. In another embodiment, since the water cleanliness required for toilet flushing and irrigation is lower than a cleanness of graywater generated by laundering, the graywater generated by laundering may be used for toilet flushing and irrigation. Those skilled in the art should understand that the recovery and reuse of other graywater are not limited to the above situations. Other situations that meet the above recovery and reuse principles are all included in the scope of protection of the present disclosure.

The other reuse of graywater is implemented by the above device and method. The graywater is used as the water source in all situations. Therefore, a toilet/urinal to be flushed, flowers and plants to be irrigated, a washing machine to be used for washing clothes, shower/bath to be performed, and a sink in kitchen/hand washing sink to be used may all be used as target positions of the reuse of the graywater.

A controller may be included in the present disclosure and can be implemented by any appliances. The controller may include a processor, a memory, and a communication interface for interfacing with the devices as discussed in the present disclosure. The components of the controller may communicate using bus. The controller may be connected to a workstation or another external device (e.g., control panel, remote) and/or a database for receiving user inputs, system characteristics, and any of the values described herein. Optionally, the controller may include an input device and/or a sensing circuit in communication with any of the sensors. The sensing circuit receives sensor measurements from as described above. Optionally, the controller may include a drive unit for receiving and reading non-transitory computer media having instructions. Additional, different, or fewer components may be included. The processor is configured to perform instructions stored in memory for executing the algorithms described herein.

Processor may be a general purpose or specific purpose processor, an application specific integrated circuit (ASIC), one or more programmable logic controllers (PLCs), one or more field programmable gate arrays (FPGAs), a group of processing components, or other suitable processing components. Processor is configured to execute computer code or instructions stored in memory or received from other computer readable media (e.g., embedded flash memory, local hard disk storage, local ROM, network storage, a remote server, etc.). The processor may be a single device or combinations of devices, such as associated with a network, distributed processing, or cloud computing.

Memory may include one or more devices (e.g., memory units, memory devices, storage devices, etc.) for storing data and/or computer code for completing and/or facilitating the various processes described in the present disclosure. Memory may include random access memory (RAM), read-only memory (ROM), hard drive storage, temporary storage, non-volatile memory, flash memory, optical memory, or any other suitable memory for storing software objects and/or computer instructions. Memory may include database components, object code components, script components, or any other type of information structure for supporting the various activities and information structures described in the present disclosure. Memory may be communicably connected to processor via a processing circuit and may include computer code for executing (e.g., by processor) one or more processes described herein. For example, memory may include graphics, web pages, HTML files, XML files, script code, shower configuration files, or other resources for use in generating graphical user interfaces for display and/or for use in interpreting user interface inputs to make command, control, or communication decisions.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface. The communication interface may be connected to a network. The network may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The foregoing description is only the specific implementations of the present application, but the scope of protection of the present application is not limited to these. Those skilled in the art may easily think of changes or substitutions within the technical scope disclosed in the present application, which should be included in the scope of protection of the present application. Therefore, the scope of protection of the present application should be subject to the appended claims.

We claim:

1. A system for recovering and reusing graywater generated from a plurality of graywater sources in a building, the system comprising:
   a controller configured to control recovery and reuse of the graywater collected from the plurality of graywater sources in the building; and
   a plurality of pipelines communicably coupled to the controller and configured to distribute the collected graywater to a plurality of target positions, including at least one position corresponding to at least one graywater source of the plurality of graywater sources, in the building for reuse,
   wherein the controller is further configured to control the graywater in a corresponding pipeline of the plurality of pipelines to deliver an amount of the graywater to a target position of the plurality of target positions designated by a user for reuse according to a control signal sent by the user, and the amount of the graywater is designated by the user,
   wherein the controller is further configured to control the graywater in the plurality of pipelines to distribute the graywater according to a cleanliness of the graywater required by a reuse purpose and a cleanliness of each of the plurality of graywater sources,
   wherein in response to a determination that the cleanliness of the at least one graywater source is higher than the cleanliness of the graywater required by the reuse purpose, the controller controls the graywater from the at least one graywater source, having the cleanliness higher than the cleanliness of the graywater required by the reuse purpose, to the reuse purpose.

2. The system according to claim 1,
   wherein the system further comprises a discharge pipeline configured to receive the graywater generated from the plurality of graywater sources in the building,
   wherein the system further comprises a graywater processing device configured to preprocess the graywater before the graywater is reused, and
   wherein the graywater processing device is mounted in a downstream position of the discharge pipeline.

3. The system according to claim 2,
   wherein the graywater processing device comprises a reverse osmosis device, and wherein the reverse osmosis device comprises:
a liquid inlet configured to receive a liquid to be processed;
a purified water outlet configured to output purified water generated by reverse osmosis processing; and
a graywater outlet configured to output graywater preprocessed by reverse osmosis processing.

4. The system according to claim 3, wherein a ratio of the purified water outputted from the purified water outlet to the preprocessed graywater outputted from the graywater outlet is adjustable by the reverse osmosis device according to a reuse purpose.

5. The system according to claim 2, wherein the graywater processing device is disposed in a basement or a garage of the building.

6. The system according to claim 1, wherein the plurality of graywater sources in the building comprises: graywater generated from a kitchen, a hand washing sink, a shower/bath, a washing machine, a refrigerator, or irrigation.

7. The system according to claim 1, wherein the controller is configured to control the graywater in the corresponding pipeline of the plurality of pipelines to deliver the amount of the graywater to the target position of the plurality of target positions according to the control signal sent by the user and according to a control authority of the user, and the amount of the graywater is designated by the user.

8. A method for recovering and reusing graywater generated from a plurality of graywater sources in a building, the method comprising:
controlling, by a controller, recovery and reuse of the graywater collected from the plurality of graywater sources in the building; and
distributing, by a plurality of pipelines communicably coupled to the controller, the collected graywater to a plurality of target positions, including at least one position corresponding to at least one graywater source of the plurality of graywater sources, in the building for reuse,
wherein the method further comprises controlling, by the controller, the graywater in a corresponding pipeline of the plurality of pipelines to deliver the graywater to a target position of the plurality of target positions designated by a user for reuse according to a control signal sent by the user and according to a control authority of the user,
wherein the method further comprises controlling the graywater in the plurality of pipelines to distribute the graywater according to a cleanliness of the graywater required by a reuse purpose and a cleanliness of each of the plurality of graywater sources, and
wherein in response to a determination that the cleanliness of the at least one graywater source is higher than the cleanliness of the graywater required by the reuse purpose, the at least one graywater source, having the cleanliness higher than the cleanliness of the graywater required by the reuse purpose, is used for the reuse purpose.

9. The method according to claim 8, further comprising:
receiving, by a discharge pipeline, the graywater generated from the plurality of graywater sources in the building; and
preprocessing, by a graywater processing device, the graywater before the graywater is reused,
wherein the graywater processing device is mounted in a downstream position of the discharge pipeline.

10. The method according to claim 9, wherein the graywater processing device is disposed in a basement or a garage of the building.

11. The method according to claim 8, wherein the plurality of graywater sources in the building comprises: graywater generated from a kitchen, a hand washing sink, a shower/bath, a washing machine, a refrigerator, or irrigation.

12. The method according to claim 8, further comprising:
controlling, by the controller, the graywater in the corresponding pipeline of the plurality of pipelines to deliver an amount of the graywater to the target position of the plurality of target positions designated by a user for reuse according to the control signal sent by the user and according to the control authority of the user,
wherein the amount of the graywater and the target position are designated by the user.

13. A control system for recovering and reusing graywater generated from a plurality of graywater sources in a building, the control system comprising:
a controller configured to control recovery and reuse of the graywater and communicate with a plurality of pipelines configured to distribute the graywater to a plurality of target positions, including at least one position corresponding to at least one graywater source of the plurality of graywater sources, in the building for reuse,
wherein the controller is further configured to control the graywater in a corresponding pipeline of the plurality of pipelines to deliver an amount of the graywater to a target position of the plurality of target positions designated by a user for reuse according to a control signal sent by the user and according to a control authority of the user, and the amount of the graywater is designated by the user,
wherein the controller is further configured to control the graywater in the plurality of pipelines to distribute the graywater according to a cleanliness of the graywater required by a reuse purpose and a cleanliness of each of the plurality of graywater sources, and
wherein in response to a determination that the cleanliness of the at least one graywater source is higher than the cleanliness of the graywater required by the reuse purpose, the controller controls the graywater from the at least one graywater source, having the cleanliness higher than the cleanliness of the graywater required by the reuse purpose, to the reuse purpose.

14. The control system according to claim 13, further comprising a graywater processing device configured to preprocess the graywater before the graywater is reused.

15. The control system according to claim 14, wherein the graywater processing device is disposed in a basement or a garage of the building.

* * * * *